United States Patent
Guo et al.

(10) Patent No.: US 12,304,858 B2
(45) Date of Patent: May 20, 2025

(54) COLORED GLASS ARTICLES HAVING IMPROVED MECHANICAL DURABILITY

(71) Applicant: CORNING INCORPORATED, Corning, NY (US)

(72) Inventors: Xiaoju Guo, Pittsford, NY (US); Karl William Koch, III, Elmira, NY (US); Liping Xiong Smith, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 254 days.

(21) Appl. No.: 17/841,776

(22) Filed: Jun. 16, 2022

(65) Prior Publication Data

US 2022/0402806 A1 Dec. 22, 2022

Related U.S. Application Data

(60) Provisional application No. 63/212,179, filed on Jun. 18, 2021.

(51) Int. Cl.
| | |
|---|---|
| *C03C 3/093* | (2006.01) |
| *C03C 4/02* | (2006.01) |
| *C03C 21/00* | (2006.01) |

(52) U.S. Cl.
CPC .............. *C03C 3/093* (2013.01); *C03C 4/02* (2013.01); *C03C 21/00* (2013.01)

(58) Field of Classification Search
CPC ........... C03C 3/091; C03C 3/093; C03C 4/02; C03C 21/00
See application file for complete search history.

(56) References Cited

U.S. PATENT DOCUMENTS

| | | | |
|---|---|---|---|
| 2,418,605 | A | 4/1947 | Shepherd et al. |
| 3,524,737 | A | 8/1970 | Doyle et al. |
| 3,751,238 | A | 8/1973 | Grego et al. |
| 3,778,335 | A | 12/1973 | Boyd |
| 3,788,865 | A | 1/1974 | Busdiecker et al. |
| 3,902,881 | A | 9/1975 | Pirooz |
| 4,086,089 | A | 4/1978 | Works |
| 4,102,664 | A | 7/1978 | Dumbaugh, Jr. |
| 4,240,836 | A | 12/1980 | Borrelli et al. |
| 4,298,389 | A | 11/1981 | Johnson et al. |
| 4,786,305 | A | 11/1988 | Ball et al. |
| 4,814,297 | A | 3/1989 | Beall et al. |
| 6,333,286 | B1 | 12/2001 | Kurachi et al. |
| 6,340,647 | B1 | 1/2002 | Koyama et al. |
| 6,365,534 | B1 | 4/2002 | Koyama et al. |
| 6,374,641 | B1 | 4/2002 | Chu et al. |
| 6,376,403 | B1 | 4/2002 | Koyama et al. |
| 6,532,770 | B2 | 3/2003 | Uhlik et al. |
| 6,547,980 | B1 | 4/2003 | Kurachi et al. |
| 7,192,898 | B2 | 3/2007 | Mori et al. |
| 7,659,221 | B2 | 2/2010 | Arbab et al. |
| 7,666,511 | B2 | 2/2010 | Ellison et al. |
| 8,127,571 | B2 | 3/2012 | Martin et al. |
| 8,168,313 | B2 | 5/2012 | Endo et al. |
| 8,232,218 | B2 | 7/2012 | Dejneka et al. |
| 8,455,066 | B2 | 6/2013 | Heithoff et al. |
| 8,962,503 | B2 | 2/2015 | Nagai et al. |
| 9,053,734 | B2 | 6/2015 | Kajita et al. |
| 9,156,725 | B2 | 10/2015 | Dejneka et al. |
| 9,199,876 | B2 | 12/2015 | Wang et al. |
| 9,284,215 | B2 | 3/2016 | Yamamoto et al. |
| 9,403,716 | B2 | 8/2016 | Dejneka et al. |
| 9,595,960 | B2 | 3/2017 | Wilford |
| 9,701,570 | B2 | 7/2017 | Mauro et al. |
| 9,790,124 | B2 | 10/2017 | Dejneka et al. |
| 9,963,378 | B2 | 5/2018 | Yamamoto |

(Continued)

FOREIGN PATENT DOCUMENTS

| | | |
|---|---|---|
| CN | 102960081 A | 3/2013 |
| CN | 104640820 A | 5/2015 |

(Continued)

OTHER PUBLICATIONS

"Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992),".
"Reddy, K. P. R. et al., "Fracture Toughness Measurement of Glass and Ceramic Materials Using Chevron-Notched Specimens," J. Am. Ceram. Soc., 71 [6], C-310-C-313 (1988)".
ASTM C1351M—96(2017) "Standard Test Method for Measurement of Viscosity of Glass Between 104 Pas and 108 Pas by Viscous Compression of a Solid Right Cylinder".
ASTM C829-81 (2015), titled "Standard Practice for Measurement of L-iquidus Temperature of Glass by the Gradient Furnace Method."
ASTM E228-85 (1989), "Standard Test Method for Linear Thermal Expansion of Solid Materials With a Vitreous Silica Dilatometer".
ASTM standard C770-16, entitled "Standard Test Method for Measurement of Glass Stress-Optical Coefficient,".

(Continued)

*Primary Examiner* — Elizabeth A. Bolden

(74) *Attorney, Agent, or Firm* — John P. McGroarty; Travis B. Gasa

(57) ABSTRACT

A colored glass article includes greater than or equal to 50 mol % and less than or equal to 70 mol % $SiO_2$, greater than or equal to 10 mol % and less than or equal to 17.5 mol % $Al_2O_3$, greater than or equal to 3 mol % and less than or equal to 10 mol % $B_2O_3$, greater than or equal to 8.8 mol % and less than or equal to 14 mol % $Li_2O$, greater than or equal to 1.5 mol % and less than or equal to 8 mol % $Na_2O$, and greater than 0 mol % and less than or equal to 2 mol % $Cr_2O_3$. $R_2O+RO-Al_2O_3$ is greater than or equal to 0.5 mol % and less than or equal to 6 mol %. $Al_2O_3+MgO+ZnO$ is greater than or equal to 12 mol % and less than or equal to 22 mol %.

20 Claims, 9 Drawing Sheets

(56) References Cited

U.S. PATENT DOCUMENTS

| | | | |
|---|---|---|---|
| 10,081,568 B2 | 9/2018 | Plevacova et al. | |
| 10,246,371 B1 | 4/2019 | Dejneka et al. | |
| 10,577,275 B2 | 3/2020 | Lambricht et al. | |
| 10,626,043 B2 | 4/2020 | Lambricht et al. | |
| 10,656,454 B2 | 5/2020 | Bazemore et al. | |
| 11,059,739 B2 | 7/2021 | Wolfinger et al. | |
| 11,072,557 B2 | 7/2021 | Weiss et al. | |
| 11,161,768 B2 | 11/2021 | Lambricht et al. | |
| 11,192,817 B2 | 12/2021 | Ono | |
| 11,267,748 B2 | 3/2022 | Siebers et al. | |
| 11,390,560 B2 | 7/2022 | Murayama et al. | |
| 11,420,898 B2 | 8/2022 | He et al. | |
| 11,560,329 B1 | 1/2023 | Guo et al. | |
| 11,597,674 B2 | 3/2023 | Guo et al. | |
| 11,613,497 B2 | 3/2023 | Finkeldey et al. | |
| 11,802,072 B2 | 10/2023 | Guo et al. | |
| 11,891,332 B2 | 2/2024 | Guo et al. | |
| 12,054,422 B2 | 8/2024 | Guo et al. | |
| 2003/0210535 A1 | 11/2003 | Gaides | |
| 2007/0158317 A1 | 7/2007 | Brix et al. | |
| 2010/0035038 A1 | 2/2010 | Barefoot et al. | |
| 2012/0135848 A1 | 5/2012 | Beall et al. | |
| 2013/0128434 A1 | 5/2013 | Yamamoto et al. | |
| 2013/0136909 A1 | 5/2013 | Mauro et al. | |
| 2014/0066285 A1 | 3/2014 | Beall et al. | |
| 2014/0087194 A1 | 3/2014 | Dejneka et al. | |
| 2014/0243183 A1 | 8/2014 | Beall et al. | |
| 2014/0285956 A1 | 9/2014 | Russell-Clarke et al. | |
| 2015/0064474 A1 | 3/2015 | Dejneka et al. | |
| 2015/0166400 A1 | 6/2015 | Yamamoto | |
| 2015/0166403 A1 | 6/2015 | Yamamoto | |
| 2015/0368149 A1 | 12/2015 | Guo et al. | |
| 2015/0376055 A1* | 12/2015 | Fu | C03C 21/002 |
| | | | 501/32 |
| 2016/0090321 A1 | 3/2016 | Bookbinder et al. | |
| 2016/0168023 A1 | 6/2016 | Baum et al. | |
| 2016/0326045 A1 | 11/2016 | Li | |
| 2017/0166478 A1 | 6/2017 | Gross et al. | |
| 2017/0184764 A1 | 6/2017 | Matsuyuki et al. | |
| 2017/0217825 A1 | 8/2017 | Hasegawa et al. | |
| 2017/0291849 A1 | 10/2017 | Dejneka et al. | |
| 2017/0305786 A1 | 10/2017 | Roussev et al. | |
| 2017/0355636 A1 | 12/2017 | Borrelli et al. | |
| 2018/0148370 A1 | 5/2018 | Baker et al. | |
| 2018/0162768 A1 | 6/2018 | Boek et al. | |
| 2018/0362390 A1 | 12/2018 | Claireaux et al. | |
| 2019/0071345 A1 | 3/2019 | Mauro et al. | |
| 2019/0177206 A1 | 6/2019 | Dejneka et al. | |
| 2019/0177209 A1 | 6/2019 | Dejneka et al. | |
| 2019/0263713 A1 | 8/2019 | Murayama et al. | |
| 2019/0300422 A1 | 10/2019 | Guo et al. | |
| 2020/0140322 A1 | 5/2020 | Comte et al. | |
| 2020/0189962 A1 | 6/2020 | Dejneka et al. | |
| 2020/0377404 A1 | 12/2020 | Beall et al. | |
| 2020/0385303 A1 | 12/2020 | Kiczenski et al. | |
| 2020/0398539 A1 | 12/2020 | Brennan et al. | |
| 2021/0155530 A1 | 5/2021 | Cui et al. | |
| 2021/0155531 A1 | 5/2021 | Dejneka et al. | |
| 2022/0135466 A1 | 5/2022 | Maeda et al. | |
| 2022/0371942 A1 | 11/2022 | Ping et al. | |
| 2022/0402805 A1 | 12/2022 | Guo et al. | |
| 2022/0402808 A1 | 12/2022 | Guo et al. | |
| 2023/0056403 A1 | 2/2023 | Nguyen et al. | |
| 2024/0025796 A1 | 1/2024 | Guo et al. | |
| 2024/0116801 A1 | 4/2024 | Guo et al. | |

FOREIGN PATENT DOCUMENTS

| | | |
|---|---|---|
| CN | 107935410 A | 4/2018 |
| CN | 108715510 A | 10/2018 |
| CN | 109970362 A | 7/2019 |
| CN | 110216384 A | 9/2019 |
| CN | 110255896 A | 9/2019 |
| CN | 110615610 A | 12/2019 |
| CN | 113845302 A | 12/2021 |
| DE | 10141666 A1 | 3/2003 |
| EP | 1593658 A1 | 11/2005 |
| EP | 2764320 A2 | 8/2014 |
| EP | 3390311 B1 | 8/2019 |
| GB | 1124001 A | 8/1968 |
| JP | 55-045501 A | 3/1980 |
| JP | 63-166736 A | 7/1988 |
| JP | 2000-203872 A | 7/2000 |
| JP | 2003-306348 A | 10/2003 |
| JP | 4192232 B2 | 12/2008 |
| JP | 4303999 B2 | 7/2009 |
| JP | 7136100 B2 | 9/2022 |
| RU | 2645687 C1 | 2/2018 |
| WO | 2013/050727 A2 | 4/2013 |
| WO | 2013/099994 A1 | 7/2013 |
| WO | 2014/136751 A1 | 9/2014 |
| WO | 2017/218468 A1 | 12/2017 |
| WO | 2019/064280 A1 | 4/2019 |
| WO | 2019/083937 A2 | 5/2019 |
| WO | 2019/127818 A1 | 7/2019 |
| WO | 2021/010376 A1 | 1/2021 |
| WO | 2021/136726 A1 | 7/2021 |
| WO | 2023/107409 A1 | 6/2023 |

OTHER PUBLICATIONS

ASTM standard C770-16, 2020, entitled "Standard Test Method for Measurement of Glass Stress-Optical Coefficient,".

Sasai, Jun, and Kazuyuki Hirao. "Crystallization effect on non-linear optical response of silicate glass and glass-ceramics containing gold nanoparticles." Journal of non-crystalline solids 290, No. 1 (2001): 49-56.

"Diffuse uniform LED back lighting for capacitive touch keypads", Retrieved from: http://www.rapidkeypads.com/diffuse-uniform-led-back-lighting.php, Retrieved Date: Jun. 13, 2023.

"Infrared Sensors Market Set to Show Upsurge With Rise in Home Automated Products—IndustryARC Analysis", 2017, Retreived from: https://globenewswire.com/news-release/2017/03/21/942857/0/en/Infrared-Sensors-Market-Set-To-Show-Upsurge-With-Rise-In-Home-Automated-Products-IndustryARC-Analysis.html, Retrieved on Jan. 16, 2023.

"Near Infrared Imaging Market—Global Forecast to 2020", Fast Market Research, 2022, Retreived from: http://www.sbwire.com/press-releases/just-published-near-infrared-imaging-market-global-672492.htm, Retrieved on Jan. 16, 2023.

"Plexiglass Acrylic Sheets", Retrieved from: http://www.eplastics.com/Plastic/Plexiglass_Acrylic_Sheet_Infrared_Transmitting?gclid=EAIaIQobChMIsL6mu7jp2AIVxRuBCh1EIQyVEAYYASABEgLs_ID_BWE, Retrieved on: Jan. 12, 2023.

Alan R. Frank, "Near-Infrared Image Sensor Targets IoT Camera Market", Mar. 2016, Retrieved from: http://electronics360.globalspec.com/article/6487/near-infrared-image-sensor-targets-iot-camera-market, Retrieve on: Jan. 12, 2023.

David Ashkenasi, Andreas Lemke, "Picosecond laser-induced color centers in glass optics", J. Laser Appl. 23, 012007 (2011).

Hirao et al., "Crystallization effect on non-linear optical response of silicate glass and glass-ceramics containing gold nanoparticles." Journal of non-crystalline solids, vol. 290, No. 1, 2001, pp. 49-56.

International Search Report and Written Opinion of the International Searching Authority; PCT/US2022/033703; mailed on Nov. 9, 2022, 11 pages; European Patent Office.

International Search Report and Written Opinion of the International Searching Authority; PCT/US2022/033909; mailed on Dec. 8, 2022, 12 pages; European Patent Office.

International Search Report and Written Opinion of the International Searching Authority; PCT/US2022/033917; dated Nov. 28, 2022; 12 pages; European Patent Office.

International Search Report and Written Opinion of the International Searching Authority; PCT/US2022/050344; mailed on Mar. 31, 2023, 11 pages; European Patent Office.

Llordes, et al., "Tunable near-infrared and visible-light transmittance in nanocrystals-in-glass composites", Nat. Lett., vol. 500, 2013, pp. 323-327.

(56) References Cited

OTHER PUBLICATIONS

Sheng, J., K. Kadono, and T. Yazawa. "Easily recyclable coloured glass by x-ray irradiation induced coloration." Glass technology 43, No. 6 (2002): 238-244.
Stookey, S. D. "Coloration of glass by gold, silver, and copper." Journal of the American Ceramic Society 32, No. 8 (1949): 246-249.
Stookey, S. D. "Coloration of glass by gold, silver, and copper." Journal of the American Ceramic Society, vol. 32, No. 8, 1949, pp. 246-249.
Yamashita, Masaru, Zhidong Yao, Yoshinobu Matsumoto, Yasushi Utagawa, Kohei Kadono, and Tetsuo Yazawa. "X-ray irradiation-induced coloration of manganese in soda-lime silicate glass." Journal of non-crystalline solids 333, No. 1 (2004): 37-43.
Yazawa, et al., "Nanosized gold clusters formation in selected areas of soda-lime silicate glass." Journal of non-crystalline solids, vol. 324, No. 3, 2003, pp. 295-299.

\* cited by examiner

COLORED GLASS ARTICLES HAVING IMPROVED MECHANICAL DURABILITY This application claims the benefit of priority under 35 U.S.C. § 119 of U.S. Provisional Application Ser. No. 63/212,179 filed on Jun. 18, 2021, the content of which is relied upon and incorporated herein by reference in its entirety.

FIELD

The present specification generally relates to glass compositions and glass articles and, in particular, to glass compositions and ion-exchangeable, colored glass articles formed therefrom.

Technical Background

Aluminosilicate glass articles may exhibit superior ion-exchangeability and drop performance. Various industries, including the consumer electronics industry, desire colored materials with the same or similar strength and fracture toughness properties. However, simply including colorants in conventional aluminosilicate glass compositions may not produce the desired color.

Accordingly, a need exists for an alternative colored glass articles having high strength and fracture toughness.

SUMMARY

According to a first aspect A1, a colored glass article may comprise: greater than or equal to 50 mol % and less than or equal to 70 mol % $SiO_2$; greater than or equal to 10 mol % and less than or equal to 17.5 mol % $Al_2O_3$; greater than or equal to 3 mol % and less than or equal to 10 mol % $B_2O_3$; greater than or equal to 8.8 mol % and less than or equal to 14 mol % $Li_2O$; greater than or equal to 1.5 mol % and less than or equal to 8 mol % $Na_2O$; and greater than 0 mol % and less than or equal to 2 mol % $Cr_2O_3$, wherein: $R_2O+RO-Al_2O_3$ is greater than or equal to 0.5 mol % and less than or equal to 6 mol %, wherein $R_2O$ is the sum of $Li_2O$, $Na_2O$, and $K_2O$ and RO is the sum of MgO, ZnO, and CaO; and $Al_2O_3+MgO+ZnO$ is greater than or equal to 12 mol % and less than or equal to 22 mol %.

A second aspect A2 includes the colored glass article according to the first aspect A1, wherein the colored glass article has a transmittance color coordinate in the CIELAB color space, as measured at an article thickness of 1.5 mm under F2 illumination and a 10° standard observer angle, of: L* greater than or equal to 0 and less than or equal to 100; a* greater than or equal to −18 and less than or equal to 0; and b* greater than or equal to 0 and less than or equal to 82.

A third aspect A3 includes the colored glass article according to the first aspect A1 or the second aspect A2, wherein MgO+ZnO is greater than or equal to 0 mol % and less than or equal to 4.5 mol %.

A fourth aspect A4 includes the colored glass article according to the third aspect A3, wherein MgO+ZnO is greater than or equal to 0 mol % and less than or equal to 1 mol %.

A fifth aspect A5 includes the colored glass article according to the third aspect A3, wherein MgO+ZnO is greater than or equal to 1 mol % and less than or equal to 4.5 mol %.

A sixth aspect A6 includes the colored glass article according to any one of the first through fifth aspects A1-A5, wherein $R_2O+RO-Al_2O_3$ is greater than or equal to 1 mol % and less than or equal to 5.5 mol %.

A seventh aspect A7 includes the colored glass article according to any one of the first through sixth aspects A1-A6, wherein $Al_2O_3+MgO+ZnO$ is greater than or equal to is greater than or equal to 13 mol % and less than or equal to 21.5 mol %.

An eighth aspect A8 includes the colored glass article according to any one of the first through seventh aspects A13-A7, wherein the colored glass article comprises greater than or equal to 0.001 mol % and less than or equal to 1.5 mol % $Cr_2O_3$.

A ninth aspect A9 includes the colored glass article according to any one of the first through eighth aspects A1-A8, wherein the colored glass article comprises greater than or equal to 12 mol % and less than or equal to 17.25 mol % $Al_2O_3$.

A tenth aspect A10 includes the colored glass article according to any one of the first through ninth aspects A1-A9, wherein the colored glass article comprises greater than or equal to 3.5 mol % and less than or equal to 9 mol % $B_2O_3$.

An eleventh aspect A11 includes the colored glass article according to any one of the first through tenth aspects A1-A10, wherein the colored glass article comprises greater than or equal to 9 mol % and less than or equal to 13.5 mol % $Li_2O$.

A twelfth aspect A12 includes the colored glass article according to any one of the first through eleventh aspects A1-A11, wherein the colored glass article comprises greater than or equal to 2 mol % and less than or equal to 7.5 mol % $Na_2O$.

A thirteenth aspect A13 includes the colored glass article according to any one of the first through twelfth aspects A1-A12, wherein the colored glass article comprises: greater than or equal to 0 mol % and less than or equal to 4.5 mol % MgO; greater than or equal to 0 mol % and less than or equal to 4.5 mol % ZnO; and greater than or equal to 0 mol % and less than or equal to 2 mol % CaO.

A fourteenth aspect A14 includes the colored glass article according to any one of the first through thirteenth aspects A1-A13, wherein the colored glass article comprises greater than or equal to 0 mol % and less than or equal to 3 mol % $K_2O$.

A fifteenth aspect A15 includes the colored glass article according to any one of the first through fourteenth aspects A1-A14, wherein the colored glass article comprises greater than or equal to 53 mol % and less than or equal to 67 mol % $SiO_2$.

A sixteenth aspect A16 includes the colored glass article according to any one of the first through fifteenth aspects A1-A15, wherein: the colored glass article comprises greater than or equal to 0 mol % and less than or equal to 4 mol % NiO; and the colored glass article has a transmittance color coordinate in the CIELAB color space, as measured at an article thickness of 1.5 mm under F2 illumination and a 10° standard observer angle, of: L* greater than or equal to 0 and less than or equal to 100; a* greater than or equal to −18 and less than or equal to 18; and b* greater than or equal to 0 and less than or equal to 82.

A seventeenth aspect A17 includes the colored glass article according to any one of the first through fifteenth aspects A1-A15, wherein: the colored glass article comprises greater than or equal to 0 mol % and less than or equal to 2 mol % $Co_3O_4$; and the colored glass article has a transmittance color coordinate in the CIELAB color space, as measured at an article thickness of 1.5 mm under F2 illumination and a 10° standard observer angle, of: L* greater than or equal to 0 and less than or equal to 100; a* greater than or equal to −20 and less than or equal to 60; and b* greater than or equal to −90 and less than or equal to 85.

An eighteenth aspect A18 includes the colored glass article according to any one of the first through fifteenth aspects A1-A15, wherein: the colored glass article comprises greater than or equal to 0 mol % and less than or equal to 20 mol % CuO; and the colored glass article has a transmittance color coordinate in the CIELAB color space, as measured at an article thickness of 1.5 mm under F2 illumination and a 10° standard observer angle, of: L* greater than or equal to 0 and less than or equal to 100; a* greater than or equal to −35 and less than or equal to 0; and b* greater than or equal to 0 and less than or equal to 82.

A nineteenth aspect A19 includes the colored glass article according to any one of the first through fifteenth aspects A1-A15, wherein: the colored glass article comprises greater than or equal to 0 mol % and less than or equal to 4 mol % NiO and greater than or equal to 0 mol % and less than or equal to 20 mol % CuO; and the colored glass article has a transmittance color coordinate in the CIELAB color space, as measured at an article thickness of 1.5 mm under F2 illumination and a 10° standard observer angle, of: L* greater than or equal to 0 and less than or equal to 100; a* greater than or equal to −35 and less than or equal to 20; and b* greater than or equal to 0 and less than or equal to 75.

A twentieth aspect A20 includes the colored glass article according to any one of the first through fifteenth aspects A1-A15 wherein: the colored glass article comprises greater than or equal to 0 mol % and less than or equal to 4 mol % NiO and greater than or equal to 0 mol % and less than or equal to 2 mol % $Co_3O_4$; and the colored glass article has a transmittance color coordinate in the CIELAB color space, as measured at an article thickness of 1.5 mm under F2 illumination and a 10° standard observer angle, of: L* greater than or equal to 0 and less than or equal to 100; a* greater than or equal to −15 and less than or equal to 65; and b* greater than or equal to −90 and less than or equal to 80.

A twenty-first aspect A21 includes the colored glass article according to any one of the first through fifteenth aspects A1-A15, wherein: the colored glass article comprises greater than or equal to 0 mol % and less than or equal to 20 mol % CuO and greater than or equal to 0 mol % and less than or equal to 2 mol % $Co_3O_4$; and the colored glass article has a transmittance color coordinate in the CIELAB color space, as measured at an article thickness of 1.5 mm under F2 illumination and a 10° standard observer angle, of: L* greater than or equal to 0 and less than or equal to 100; a* greater than or equal to −35 and less than or equal to 60; and b* greater than or equal to −90 and less than or equal to 80.

A twenty-second aspect A22 includes the colored glass article according to any one of the first through fifteenth aspects A1-A15, wherein: the colored glass article comprises greater than or equal to 0 mol % and less than or equal to 4 mol % NiO, greater than or equal to 0 mol % and less than or equal to 20 mol % CuO, greater than or equal to 0 mol % and less than or equal to 2 mol % $Co_3O_4$; and the colored glass article has a transmittance color coordinate in the CIELAB color space, as measured at an article thickness of 1.5 mm under F2 illumination and a 10° standard observer angle, of: L* greater than or equal to 0 and less than or equal to 100; a* greater than or equal to −35 and less than or equal to 60; and b* greater than or equal to −90 and less than or equal to 80

A twenty-third aspect A23 includes the colored glass article according to any one of the first through fifteenth aspects A1-A15, wherein the colored glass article has a $K_{1C}$ fracture toughness as measured by a chevron notch short bar method of greater than or equal to 0.7 MPa*m$^{0.5}$.

A twenty-fourth aspect A24 includes the colored glass article according to any one of the first through fifteenth aspects A1-A15, wherein the colored glass article is a chemically strengthened glass article.

A twenty-fifth aspect A25 includes the colored glass article according to the twenty-fourth aspect A24, wherein the colored glass article has a surface compressive stress greater than or equal to 300 MPa.

A twenty-sixth aspect A26 includes the colored glass article according to the twenty-fourth aspect A24 or the twenty-fifth aspect A25, wherein the colored glass article has a maximum central tension greater than or equal to 40 MPa.

A twenty-seventh aspect A27 includes the colored glass article according to any one of the twenty-fourth through twenty-sixth aspects A24-A26, wherein the colored glass article has a depth of compression greater than or equal to 0.15t.

According to a twenty-eighth aspect A28, a consumer electronic device may comprise: a housing having a front surface, a back surface, and side surfaces; and electrical components provided at least partially within the housing, the electrical components including at least a controller, a memory, and a display, the display being provided at or adjacent the front surface of the housing; wherein the back surface comprises the colored glass article of any one of aspects 1-27.

According to a twenty-ninth aspect A29, a glass composition may comprise: greater than or equal to 50 mol % and less than or equal to 70 mol % $SiO_2$; greater than or equal to 10 mol % and less than or equal to 17.5 mol % $Al_2O_3$; greater than or equal to 3 mol % and less than or equal to 10 mol % $B_2O_3$; greater than or equal to 8.8 mol % and less than or equal to 14 mol % $Li_2O$; greater than or equal to 1.5 mol % and less than or equal to 8 mol % $Na_2O$; and greater than 0 mol % and less than or equal to 0.2 mol % $Cr_2O_3$, wherein: $R_2O+RO-Al_2O_3$ is greater than or equal to 0.5 mol % and less than or equal to 6 mol %, wherein $R_2O$ is the sum of $Li_2O$, $Na_2O$, and $K_2O$ and RO is the sum of MgO, ZnO, and CaO; and $Al_2O_3+MgO+ZnO$ is greater than or equal to 12 mol % and less than or equal to 22 mol %.

A thirtieth aspect A30 includes the glass composition according to the twenty-ninth aspect A29, wherein MgO+ZnO is greater than or equal to 0 mol % and less than or equal to 4.5 mol %.

A thirty-first aspect A31 includes the glass composition according to the thirtieth aspect A30, wherein MgO+ZnO is greater than or equal to 0 mol % and less than or equal to 1 mol %.

A thirty-second aspect A32 includes the glass composition according to the thirtieth aspect A30, wherein MgO+ZnO is greater than or equal to 1 mol % and less than or equal to 4.5 mol %.

A thirty-third aspect A33 includes the glass composition according to any one of the twenty-ninth through thirty-second aspects A29-A32, wherein $R_2O+RO-Al_2O_3$ is greater than or equal to 1 mol % and less than or equal to 5.5 mol %.

A thirty-fourth aspect A34 includes the glass composition according to any one of the twenty-ninth through thirty-third aspects A29-A33, wherein $Al_2O_3+MgO+ZnO$ is greater than or equal to is greater than or equal to 14 mol % and less than or equal to 20 mol %.

A thirty-fifth aspect A35 includes the glass composition according to any one of the twenty-ninth through thirty-fourth aspects A29-A34, wherein the glass composition comprises greater than or equal to 0.001 mol % and less than or equal to 1.5 mol % $Cr_2O_3$.

A thirty-sixth aspect A36 includes the glass composition according to any one of the twenty-ninth through thirty-fiftieth aspects A29-A35, wherein the glass composition comprises greater than or equal to 12 mol % and less than or equal to 17 mol % $Al_2O_3$.

A thirty-seventh aspect A37 includes the glass composition according to any one of the twenty-ninth through thirty-sixth aspects A29-A36, wherein the glass composition comprises greater than or equal to 4 mol % and less than or equal to 8 mol % $B_2O_3$.

A thirty-eighth aspect A38 includes the glass composition according to any one of the twenty-ninth through thirty-seventh aspects A29-A37, wherein the glass composition comprises greater than or equal to 9 mol % and less than or equal to 13 mol % $Li_2O$.

A thirty-ninth aspect A39 includes the glass composition according to any one of the twenty-ninth through thirty-eighth aspects A29-A38, wherein the glass composition comprises greater than or equal to 3 mol % and less than or equal to 7 mol % $Na_2O$.

A fortieth aspect A40 includes the glass composition according to any one of the twenty-ninth through thirty-ninth aspects A29-A39, wherein the glass composition comprises: greater than or equal to 0 mol % and less than or equal to 4.5 mol % MgO; greater than or equal to 0 mol % and less than or equal to 4.5 mol % ZnO; and greater than or equal to 0 mol % and less than or equal to 2 mol % CaO.

A forty-first aspect A41 includes the glass composition according to any one of the twenty-ninth through fortieth aspects A29-A40, wherein the glass composition comprises greater than or equal to 0 mol % and less than or equal to 3 mol % $K_2O$.

A forty-second aspect A42 includes the glass composition according to any one of the twenty-ninth through forty-first aspects A29-A41, wherein the glass composition comprises greater than or equal to 53 mol % and less than or equal to 65 mol % $SiO_2$.

A forty-third aspect A43 includes the glass composition according to any one of the twenty-ninth through forty-second aspects A29-A42, wherein the glass composition comprises NiO, CuO, $Co_3O_4$, or combinations thereof.

Additional features and advantages of the colored glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
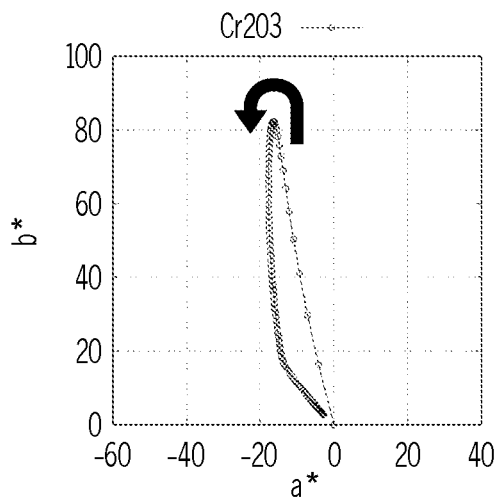
FIG. 1 is a plot of a projected a* vs. b* CIELAB space (x-axis: a*; y-axis: b*) of a colored glass article made from a glass composition according to one or more embodiments described herein.

Reference will now be made in detail to various embodiments of glass compositions and colored glass articles formed therefrom having a desired color. According to embodiments, a colored glass article includes greater than or equal to 50 mol % and less than or equal to 70 mol % $SiO_2$, greater than or equal to 10 mol % and less than or equal to 17.5 mol % $Al_2O_3$, greater than or equal to 3 mol % and less than or equal to 10 mol % $B_2O_3$, greater than or equal to 8.8 mol % and less than or equal to 14 mol % $Li_2O$, greater than or equal to 1.5 mol % and less than or equal to 8 mol % $Na_2O$, and greater than 0 mol % and less than or equal to 2 mol % $Cr_2O_3$. $R_2O+RO-Al_2O_3$ is greater than or equal to 0.5 mol % and less than or equal to 6 mol %. $R_2O$ is the sum of $Li_2O$, $Na_2O$, and $K_2O$ and RO is the sum of MgO, ZnO, and CaO. $Al_2O_3+MgO+ZnO$ is greater than or equal to 12 mol % and less than or equal to 22 mol %. Various embodiments of colored glass articles and methods of making the same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions described herein, the concentrations of constituent components (e.g., $SiO_2$, $Al_2O_3$, and the like) are specified in mole percent (mol %) on an oxide basis, unless otherwise specified.

The term "fracture toughness," as used herein, refers to the $K_{1C}$ value, and is measured by the chevron notched short bar method. The chevron notched short bar (CNSB) method is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1–30 (October 1992).

The term "melting point," as used herein, refers to the temperature at which the viscosity of the glass composition is 200 poise.

The term "softening point," as used herein, refers to the temperature at which the viscosity of the glass composition is $1\times10^{7.6}$ poise. The softening point is measured according to the parallel plate viscosity method which measures the viscosity of inorganic glass from $10^7$ to $10^9$ poise as a function of temperature, similar to ASTM C1351M.

The terms "annealing point" as used herein, refer to the temperature at which the viscosity of the glass composition is $1\times10^{13.18}$ poise.

The term "strain point," as used herein, refers to the temperature at which the viscosity of the glass composition is $1\times10^{14.68}$ poise.

The term "linear coefficient of thermal expansion" and "CTE," as described herein, is measured in accordance with ASTM E228-85 over the temperature range of 25° C. to 300° C. and is expressed in terms of "$\times10^{-7}$/° C."

The term "liquidus viscosity," as used herein, refers to the viscosity of the glass composition at the onset of devitrification (i.e., at the liquidus temperature as determined with the gradient furnace method according to ASTM C829-81).

The term "liquidus temperature," as used herein, refers to the temperature at which the glass composition begins to devitrify as determined with the gradient furnace method according to ASTM C829-81.

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass article. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The phrase "depth of compression" (DOC), as used herein, refers to the position in the article where compressive stress transitions to tensile stress.

The term "CIELAB color space," as used herein, refers to a color space defined by the International Commission on Illumination (CIE) in 1976. It expresses color as three values: L* for the lightness from black (0) to white (100), a* from green (−) to red (+), and B* from blue (−) to yellow (+).

The term "color gamut," as used herein, refers to the pallet of colors that may be achieved by the colored glass articles within the CIELAB color space.

The term "projected color gamut," as used herein, refers to the line, surface, volume, or overlapping volume occupied by the colored glass article within the three-dimensional CIELAB color space and represents the pallet of colors that may be achieved by the colored glass articles within the CIELAB color space based upon the concentration of colorant(s) present in the colored glass article. The projected color gamuts shown herein were produced using the plotting routine Gnuplot Version 5.4. Specifically, Gnuplot was used to display projections of the CIELAB color coordinates for the transmitted colors under F2 illumination for the CIE 1976 10° Standard Observer. The transmittance spectrum through a flat sheet of glass is given by the following expression:

$$T(\lambda) = \frac{[1-R(\lambda)]^2 \times \exp\left[-\sum_i N_i \sigma_i(\lambda) t\right]}{1-R(\lambda)^2 \times \exp\left[-2\sum_i N_i \sigma_i(\lambda) t\right]},$$

where R is the Fresnel intensity reflection coefficient of the glass, $N_i$ and $\sigma_i$ represent the number density and absorption cross section, respectively, for the individual dopants, $\lambda$ is the optical wavelength, and t is the thickness of the glass. The color coordinates were calculated from the transmittance spectra through 1.5-mm of the colored glass article. The expression for the transmittance was evaluated by varying the dopant concentrations ($N_i$) for the combinations of the colorants from 0 to a maximum value. As described herein, the maximum values for $Cr_2O_3$, NiO, CuO, and $Co_3O_4$ were set to 2 mol %, 4 mol %, 20 mol %, and 2 mol %, respectively.

Colorants have been added to conventional aluminosilicate glass compositions to achieve a colored glass article having a desired color and improved mechanical properties. For example, chromium (Cr) doped glass articles are green. However, simply including colorants in aluminosilicate glass compositions may not produce the desired color. For example, a conventional aluminosilicate glass composition C1 may include 58.4 mol % $SiO_2$, 17.8 mol % $Al_2O_3$, 6.07 mol % $B_2O_3$, 10.7 mol % $Li_2O$, 1.7 mol % $Na_2O$, 0.2 mol % $K_2O$, 4.43 mol % MgO, and 0.57 mol % CaO. $Cr_2O_3$ added to this conventional aluminosilicate glass composition would have low solubility and would form Cr/Mg/Zn spinel crystals because of the greater amounts of $Al_2O_3$, MgO, and ZnO present in the composition. The low solubility of $Cr_2O_3$ limits the color gamut that may be achieved and may, at most, result in a glass article having a faint green hue.

Disclosed herein are glass compositions and colored glass articles formed therefrom that mitigate the aforementioned problems such that $Cr_2O_3$ may be added to aluminosilicate glass compositions to produce colored glass articles having the desired color while retaining the superior ion-exchangeability and drop performance of the colored glass articles.

Specifically, the glass compositions disclosed herein improve $Cr_2O_3$ solubility by including a limited amount of $Al_2O_3$ (e.g., less than or equal to 17.5 mol % $Al_2O_3$ and/or $R_2O+RO-Al_2O_3$ greater than or equal to 0.5 mol %) and a limited total amount of $Al_2O_3$, MgO, and ZnO (e.g., $Al_2O_3$+MgO+ZnO less than or equal to 22 mol %). Increasing the solubility of $Cr_2O_3$ expands the color gamut that may be achieved by the resultant colored glass articles.

The glass compositions and colored glass articles described herein may be described as aluminoborosilicate glass compositions and colored glass articles and comprise $SiO_2$, $Al_2O_3$, and $B_2O_3$. In addition to $SiO_2$, $Al_2O_3$, and $B_2O_3$, the glass compositions and colored glass articles described herein include $Cr_2O_3$ to produce colored glass articles having the desired color. The glass compositions and colored glass articles described herein also include alkali oxides, such as $Li_2O$ and $Na_2O$, to enable the ion-exchangeability of the colored glass articles.

$SiO_2$ is the primary glass former in the glass compositions described herein and may function to stabilize the network structure of the colored glass articles. The concentration of $SiO_2$ in the glass compositions and resultant colored glass articles should be sufficiently high (e.g., greater than or equal to 50 mol %) to enhance the chemical durability of the glass composition and, in particular, the resistance of the glass composition to degradation upon exposure to acidic solutions, basic solutions, and in water. The amount of $SiO_2$ may be limited (e.g., to less than or equal to 70 mol %) to control the melting point of the glass composition, as the melting temperature of pure $SiO_2$ or high $SiO_2$ glasses is undesirably high. Thus, limiting the concentration of $SiO_2$ may aid in improving the meltability and the formability of the resultant colored glass article.

Accordingly, in embodiments, the glass composition and the resultant colored glass article may comprise greater than or equal to 50 mol % and less than or equal to 70 mol % $SiO_2$. In embodiments, the glass composition and the resultant colored glass article may comprise greater than or equal to 53 mol % and less than or equal to 67 mol % $SiO_2$. In embodiments, the concentration of $SiO_2$ in the glass composition and the resultant colored glass article may be greater than or equal to 50 mol %, greater than or equal to 53 mol %, greater than or equal to 55 mol %, greater than or equal to 56 mol %, or even greater than or equal to 57 mol %. In embodiments, the concentration of $SiO_2$ in the glass composition and the colored resultant glass article may be less than or equal to 70 mol %, less than or equal to 67 mol %, less than or equal to 65 mol %, less than or equal to 63 mol %, less than or equal to 60 mol %, or even less than or equal to 59 mol %. In embodiments, the concentration of $SiO_2$ in the glass composition and the resultant colored glass article may be greater than or equal to 50 mol % and less than or equal to 70 mol %, greater than or equal to 50 mol % and less than or equal to 67 mol %, greater than or equal to 50 mol % and less than or equal to 65 mol %, greater than or equal to 50 mol % and less than or equal to 63 mol %, greater than or equal to 50 mol % and less than or equal to 60 mol %, greater than or equal 50 mol % and less than or equal to 59 mol %, greater than or equal to 53 mol % and less than or equal to 70 mol %, greater than or equal to 53 mol % and less than or equal to 67 mol %, greater than or equal to 53 mol % and less than or equal to 65 mol %, greater than or equal to 53 mol % and less than or equal to 63 mol %, greater than or equal to 53 mol % and less than or equal to 60 mol %, greater than or equal 53 mol % and less than or equal to 59 mol %, greater than or equal to 55 mol % and less than or equal to 70 mol %, greater than or equal to 55 mol % and less than or equal to 67 mol %, greater than or equal to 55 mol % and less than or equal to 65 mol %, greater than or equal to 55 mol % and less than or equal to 63 mol %, greater than or equal to 55 mol % and less than or equal to 60 mol %, greater than or equal 55 mol % and less than or equal to 59 mol %, greater than or equal to 56 mol % and less than or equal to 70 mol %, greater than or equal to 56 mol % and less than or equal to 67 mol %, greater than or equal to 56 mol % and less than or equal to 65 mol %, greater than or equal to 56 mol % and less than or equal to 63 mol %, greater than or equal to 56 mol % and less than or equal to 60 mol %, greater than or equal 56 mol % and less than or equal to 59 mol %, greater than or equal to 57 mol % and less than or equal to 70 mol %, greater than or equal to 57 mol % and less than or equal to 67 mol %, greater than or equal to 57 mol % and less than or equal to 65 mol %, greater than or equal to 57 mol % and less than or equal to 63 mol %, greater than or equal to 57 mol % and less than or equal to 60 mol %, or even greater than or equal 57 mol % and less than or equal to 59 mol %, or any and all sub-ranges formed from these endpoints.

Like $SiO_2$, $Al_2O_3$ may also stabilize the glass network and additionally provides improved mechanical properties and chemical durability to the glass composition and the resultant colored glass article. The amount of $Al_2O_3$ may also be tailored to control the viscosity of the glass composition. $Al_2O_3$ may be included such that the resultant glass composition has the desired fracture toughness (e.g., greater than or equal to 0.7 MPa·m$^{1/2}$). However, if the amount of $Al_2O_3$ is too high (e.g., greater than 17.5 mol %), the solubility of $Cr_2O_3$ may decrease, resulting in the formation of Cr-spinel crystals, and the viscosity of the melt may increase, thereby diminishing the formability of the colored glass article.

Accordingly, in embodiments, the glass composition and the resultant colored glass article may comprise greater than or equal to 10 mol % and less than or equal to 17.5 mol % $Al_2O_3$. In embodiments, the glass composition and the resultant colored glass article may comprise greater than or equal to 12 mol % and less than or equal to 17.25 mol % $Al_2O_3$. In embodiments, the concentration of $Al_2O_3$ in the glass composition and the resultant colored glass article may be greater than or equal to 10 mol %, greater than or equal to 12 mol %, greater than or equal to 14 mol %, greater than or equal to 14.5 mol %, greater than or equal to 15 mol %, greater than or equal to 15.5 mol %, or even greater than or equal to 16 mol %. In embodiments, the concentration of $Al_2O_3$ in the glass composition and the resultant colored glass article may be less than or equal to 17.5 mol %, less than or equal to 17.25 mol %, less than or equal to 17 mol %, or even less than or equal to 16.75 mol %. In embodiments, the concentration of $Al_2O_3$ in the glass composition and the resultant colored glass article may be greater than or equal to 10 mol % and less than or equal to 17.5 mol %, greater than or equal to 10 mol % and less than or equal to 17.25 mol %, greater than or equal to 10 mol % and less than or equal to 17 mol %, greater than or equal to 10 mol % and less than or equal to 16.75 mol %, greater than or equal to 12 mol % and less than or equal to 17.5 mol %, greater than or equal to 12 mol % and less than or equal to 17.25 mol %, greater than or equal to 12 mol % and less than or equal to 17 mol %, greater than or equal to 12 mol % and less than or equal to 16.75 mol %, greater than or equal to 14 mol % and less than or equal to 17.5 mol %, greater than or equal to 14 mol % and less than or equal to 17.25 mol %, greater than or equal to 14 mol % and less than or equal to 17 mol %, greater than or equal to 14 mol % and less than or equal to 16.75 mol %, greater than or equal to 14.5 mol % and less than or equal to 17.5 mol %, greater than or equal to 14.5 mol % and less than or equal to 17.25 mol %, greater than or equal to 14.5 mol % and less than or equal to 17 mol %, greater than or equal to 14.5 mol % and less than or equal to 16.75 mol %, greater than or equal to 15 mol % and less than or equal to 17.5 mol %, greater than or equal to 15 mol % and less than or equal to 17.25 mol %, greater than or equal to 15 mol % and less than or equal to 17 mol %, greater than or equal to 15 mol % and less than or equal to 16.75 mol %, greater than or equal to 15.5 mol % and less than or equal to 17.5 mol %, greater than or equal to 15.5 mol % and less than or equal to 17.25 mol %, greater than or equal to 15.5 mol % and less than or equal to 17 mol %, greater than or equal to 15.5 mol % and less than or equal to 16.75 mol %, greater than or equal to 16 mol % and less than or equal to 17.5 mol %, greater than or equal to 16 mol % and less than or equal to 17.25 mol %, greater than or equal to 16 mol % and less than or equal to 17 mol %, or even greater than or equal to 16 mol % and less than or equal to 16.75 mol %, or any and all sub-ranges formed from any of these endpoints.

$B_2O_3$ decreases the melting temperature of the glass composition and may also improve the damage resistance of the resultant colored glass article. In addition, $B_2O_3$ is added to reduce the formation of non-bridging oxygen, the presence of which may reduce fracture toughness. The concentration of $B_2O_3$ should be sufficiently high (e.g., greater than or equal to 3 mol %) to improve the formability and increase the fracture toughness of the colored glass article. However, if $B_2O_3$ is too high (e.g., greater than 10 mol %), the annealing point and strain point may decrease, which increases stress relaxation and reduces overall strength of the colored glass article.

In embodiments, the glass composition and the resultant colored glass article may comprise greater than or equal to 3 mol % and less than or equal to 10 mol % $B_2O_3$. In embodiments, the glass composition and the resultant colored glass article may comprise greater than or equal to 3.5 mol % and less than or equal to 9 mol % $B_2O_3$. In embodiments, the concentration of $B_2O_3$ in the glass composition and the resultant colored glass article may be greater than or equal to 3 mol %, greater than or equal to 3.5 mol %, greater than or equal to 4 mol %, greater than or equal to 4.5 mol %, greater than or equal to 5 mol %, or even greater than or equal to 5.5 mol %. In embodiments, the concentration of $B_2O_3$ in the glass composition and the resultant colored glass article may be less than or equal to 10 mol %, less than or equal to 9 mol %, less than or equal to 8 mol %, less than or equal to 7.5 mol %, less than or equal to 7 mol %, or even less than or equal to 6.5 mol %. In embodiments, the concentration of $B_2O_3$ in the glass composition and the resultant colored glass article may be greater than or equal to 3 mol % and less than or equal to 10 mol %, greater than or equal to 3 mol % and less than or equal to 9 mol %, greater than or equal to 3 mol % and less than or equal to 8 mol %, greater than or equal to 3 mol % and less than or equal to 7.5 mol %, greater than or equal to 3 mol % and less than or equal to 7 mol %, greater than or equal to 3 mol % and less than or equal to 6.5 mol %, greater than or equal to 3.5 mol % and less than or equal to 10 mol %, greater than or equal to 3.5 mol % and less than or equal to 9 mol %, greater than or equal to 3.5 mol % and less than or equal to 8 mol %, greater than or equal to 3.5 mol % and less than or equal to 7.5 mol %, greater than or equal to 3.5 mol % and less than or equal to 7 mol %, greater than or equal to 3.5 mol % and less than or equal to 6.5 mol %, greater than or equal to 4 mol % and less than or equal to 10 mol %, greater than or equal to 4 mol % and less than or equal to 9 mol %, greater than or equal to 4 mol % and less than or equal to 8 mol %, greater than or equal to 4 mol % and less than or equal to 7.5 mol %, greater than or equal to 4 mol % and less than or equal to 7 mol %, greater than or equal to 4 mol % and less than or equal to 6.5 mol %, greater than or equal to 4.5 mol % and less than or equal to 10 mol %, greater than or equal to 4.5 mol % and less than or equal to 9 mol %, greater than or equal to 4.5 mol % and less than or equal to 8 mol %, greater than or equal to 4.5 mol % and less than or equal to 7.5 mol %, greater than or equal to 4.5 mol % and less than or equal to 7 mol %, greater than or equal to 4.5 mol % and less than or equal to 6.5 mol %, greater than or equal to 5 mol % and less than or equal to 10 mol %, greater than or equal to 5 mol % and less than or equal to 9 mol %, greater than or equal to 5 mol % and less than or equal to 8 mol %, greater than or equal to 5 mol % and less than or equal to 7.5 mol %, greater than or equal to 5 mol % and less than or equal to 7 mol %, greater than or equal to 5 mol % and less than or equal to 6.5 mol %, greater than or equal to 5.5 mol % and less than or equal to 10 mol %, greater than or equal to 5.5 mol % and less than or equal to 9 mol %, greater than or equal to 5.5 mol % and less than or equal to 8 mol %, greater than or equal to 5.5 mol % and less than or equal to 7.5 mol %, greater than or equal to 5.5 mol % and less than or equal to 7 mol %, or even greater than or equal to 5.5 mol % and less than or equal to 6.5 mol %, or any and all sub-ranges formed from any of these endpoints.

As described hereinabove, the glass compositions and the resultant colored glass articles may contain alkali oxides, such as $Li_2O$ and $Na_2O$, to enable the ion-exchangeability of the colored glass articles.

$Li_2O$ aids in the ion-exchangeability of the colored glass article and also reduces the softening point of the glass composition, thereby increasing the formability of the colored glass articles. The concentration of $Li_2O$ in the in the glass compositions and resultant colored glass articles should be sufficiently high (e.g., greater than or equal to 8.8 mol %) to achieve the desired maximum central tension (e.g., greater than or equal to 40 MPa). However, if the amount of $Li_2O$ is too high (e.g., greater than 14 mol %), the liquidus temperature may increase, thereby diminishing the manufacturability of the colored glass article.

In embodiments, the glass composition and the resultant colored glass article may comprise greater than or equal to 8.8 mol % and less than or equal to 14 mol % $Li_2O$. In embodiments, the glass composition and the resultant colored glass article may comprise greater than or equal to 9 mol % and less than or equal to 13.5 mol % $Li_2O$. In embodiments, the concentration of $Li_2O$ in the glass composition and the resultant colored glass article may be greater than or equal to 8.8 mol %, greater than or equal to 9 mol %, greater than or equal to 9.2 mol %, greater than or equal to 9.4 mol %, greater than or equal to 9.6 mol %, greater than or equal to 9.8 mol %, or even greater than or equal to 10 mol %. In embodiments, the concentration of $Li_2O$ in the glass composition and the resultant colored glass article may be less than or equal to 14 mol %, less than or equal to 13.5 mol %, less than or equal to 13 mol %, less than or equal to 12.5 mol %, less than or equal to 12 mol %, or even less than or equal to 11.5 mol %. In embodiments, the concentration of $Li_2O$ in the glass composition and the resultant colored glass article may be greater than or equal to 8.8 mol % and less than or equal to 14 mol %, greater than or equal to 8.8 mol % and less than or equal to 13.5 mol %, greater than or equal to 8.8 mol % and less than or equal to 13 mol %, greater than or equal to 8.8 mol % and less than or equal to 12.5 mol %, greater than or equal to 8.8 mol % and less than or equal to 12 mol %, greater than or equal to 8.8 mol % and less than or equal to 11.5 mol %, greater than or equal to 9 mol % and less than or equal to 14 mol %, greater than or equal to 9 mol % and less than or equal to 13.5 mol %, greater than or equal to 9 mol % and less than or equal to 13 mol %, greater than or equal to 9 mol % and less than or equal to 12.5 mol %, greater than or equal to 9 mol % and less than or equal to 12 mol %, greater than or equal to 9 mol % and less than or equal to 11.5 mol %, greater than or equal to 9.2 mol % and less than or equal to 14 mol %, greater than or equal to 9.2 mol % and less than or equal to 13.5 mol %, greater than or equal to 9.2 mol % and less than or equal to 13 mol %, greater than or equal to 9.2 mol % and less than or equal to 12.5 mol %, greater than or equal to 9.2 mol % and less than or equal to 12 mol %, greater than or equal to 9.2 mol % and less than or equal to 11.5 mol %, greater than or equal to 9.4 mol % and less than or equal to 14 mol %, greater than or equal to 9.4 mol % and less than or equal to 13.5 mol %, greater than or equal to 9.4 mol % and less than or equal to 13 mol %, greater than or equal to 9.4 mol % and less than or equal to 12.5 mol %, greater than or equal to 9.4 mol % and less than or equal to 12 mol %, greater than or equal to 9.4 mol % and less than or equal to 11.5 mol %, greater than or equal to 9.6 mol % and less than or equal to 14 mol %, greater than or equal to 9.6 mol % and less than or equal to 13.5 mol %, greater than or equal to 9.6 mol % and less than or equal to 13 mol %, greater than or equal to 9.6 mol % and less than or equal to 12.5 mol %, greater than or equal to 9.6 mol % and less than or equal to 12 mol %, greater than or equal to 9.6 mol % and less than or equal to 11.5 mol %, greater than or equal to 9.8 mol % and less than or equal to 14 mol %, greater than or equal to 9.8 mol % and less than or equal to 13.5 mol %, greater than or equal to 9.8 mol % and less than or equal to 13 mol %, greater than or equal to 9.8 mol % and less than or equal to 12.5 mol %, greater than or equal to 9.8 mol % and less than or equal to 12 mol %, greater than or equal to 9.8 mol % and less than or equal to 11.5 mol %, greater than or equal to 10 mol % and less than or equal to 14 mol %, greater than or equal to 10 mol % and less than or equal to 13.5 mol %, greater than or equal to 10 mol % and less than or equal to 13 mol %, greater than or equal to 10 mol % and less than or equal to 12.5 mol %, greater than or equal to 10 mol % and less than or equal to 12 mol %, or even greater than or equal to 10 mol % and less than or equal to 11.5 mol %, or any and all sub-ranges formed from any of these endpoints.

$Na_2O$ improves diffusivity to reduce ion-exchange time and helps achieve the desired surface compressive stress (e.g., greater than or equal to 300 MPa). $Na_2O$ also decreases the melting point and improves formability of the colored glass article. However, if too much $Na_2O$ is added to the glass composition, the melting point may be too low. As such, in embodiments, the concentration of $Li_2O$ present in the glass composition and the resultant colored glass article may be greater than the concentration of $Na_2O$ present in the glass composition and the resultant colored glass article.

In embodiments, the glass composition and the resultant colored glass article may comprise greater than or equal to 1.5 mol % and less than or equal to 8 mol % $Na_2O$. In embodiments, the glass composition and the resultant colored glass article may comprise greater than or equal to 2 mol % and less than or equal to 7.5 mol % $Na_2O$. In embodiments, the concentration of $Na_2O$ in the glass composition and the resultant colored glass article may be greater than or equal to 1.5 mol %, greater than or equal to 2 mol %, greater than or equal to 2.5 mol %, greater than or equal to 3 mol %, greater than or equal to 3.5 mol %, greater than or equal to 4 mol %, or even greater than or equal to 4.5 mol %. In embodiments, the concentration of $Na_2O$ in the glass composition and the resultant colored glass article may be less than or equal to 8 mol %, less than or equal to 7.5 mol %, less than or equal to 7 mol %, less than or equal to 6.5 mol %, or even less than or equal to 6 mol %. In embodiments, the concentration of $Na_2O$ in the glass composition and the resultant colored glass article may be greater than or equal to 1.5 mol % and less than or equal to 8 mol %, greater than or equal to 1.5 mol % and less than or equal to 7.5 mol %, greater than or equal to 1.5 mol % and less than or equal to 7 mol %, greater than or equal to 1.5 mol % and less than or equal to 6.5 mol %, greater than or equal to 1.5 mol % and less than or equal to 6 mol %, greater than or equal to 2 mol % and less than or equal to 8 mol %, greater than or equal to 2 mol % and less than or equal to 7.5 mol %, greater than or equal to 2 mol % and less than or equal to 7 mol %, greater than or equal to 2 mol % and less than or equal to 6.5 mol %, greater than or equal to 2 mol % and less than or equal to 6 mol %, greater than or equal to 2.5 mol % and less than or equal to 8 mol %, greater than or equal to 2.5 mol % and less than or equal to 7.5 mol %, greater than or equal to 2.5 mol % and less than or equal to 7 mol %, greater than or equal to 2.5 mol % and less than or equal to 6.5 mol %, greater than or equal to 2.5 mol % and less than or equal to 6 mol %, greater than or equal to 3 mol % and less than or equal to 8 mol %, greater than or equal to 3 mol % and less than or equal to 7.5 mol %, greater than or equal to 3 mol % and less than or equal to 7 mol %, greater than or equal to 3 mol % and less than or equal to 6.5 mol %, greater than or equal to 3 mol % and less than or equal to 6 mol %, greater than or equal to 3.5 mol % and less than or equal to 8 mol %, greater than or equal to 3.5 mol % and less than or equal to 7.5 mol %, greater than or equal to 3.5 mol % and less than or equal to 7 mol %, greater than or equal to 3.5 mol % and less than or equal to 6.5 mol %, greater than or equal to 3.5 mol % and less than or equal to 6 mol %, greater than or equal to 4 mol % and less than or equal to 8 mol %, greater than or equal to 4 mol % and less than or equal to 7.5 mol %, greater than or equal to 4 mol % and less than or equal to 7 mol %, greater than or equal to 4 mol % and less than or equal to 6.5 mol %, greater than or equal to 4 mol % and less than or equal to 6 mol %, greater than or equal to 4.5 mol % and less than or equal to 8 mol %, greater than or equal to 4.5 mol % and less than or equal to 7.5 mol %, greater than or equal to 4.5 mol % and less than or equal to 7 mol %, greater than or equal to 4.5 mol % and less than or equal to 6.5 mol %, or even greater than or equal to 4.5 mol % and less than or equal to 6 mol %, or any and all of these sub-ranges formed from any of these endpoints.

The glass compositions and the resultant colored glass articles described herein may further comprise alkali metal oxides other than $Li_2O$ and $Na_2O$, such as $K_2O$. $K_2O$, when included, promotes ion-exchange and may increase the depth of compression and decrease the melting point to improve the formability of the colored glass article. However, adding too much $K_2O$ may cause the surface compressive stress and melting point to be too low. Accordingly, in embodiments, the amount of $K_2O$ added to the glass composition may be limited.

In embodiments, the glass composition and the resultant colored glass article may comprise greater than or equal to 0 mol % and less than or equal to 3 mol % $K_2O$. In embodiments, the concentration of $K_2O$ in the glass composition and the resultant colored glass article may be greater than or equal to 0 mol %, greater than or equal to 0.2 mol %, or even greater than or equal to 0.4 mol %. In embodiments, the concentration of $K_2O$ in the glass composition and the resultant colored glass article may be less than or equal to 3 mol %, less than or equal to 2.5 mol %, less than or equal to 2 mol %, less than or equal to 1.5 mol %, less than or equal to 1 mol %, less than or equal to 0.75 mol %, or even less than or equal to 0.5 mol %. In embodiments, the concentration of $K_2O$ in the glass composition and the resultant colored glass article may be greater than or equal to 0 mol % and less than or equal to 3 mol %, greater than or equal to 0 mol % and less than or equal to 2.5 mol %, greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0.2 mol % and less than or equal to 3 mol %, greater than or equal to 0.2 mol % and less than or equal to 2.5 mol %, greater than or equal to 0.2 mol % and less than or equal to 2 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, greater than or equal to 0.2 mol % and less than or equal to 0.5 mol %, greater than or equal to 0.4 mol % and less than or equal to 3 mol %, greater than or equal to 0.4 mol % and less than or equal to 2.5 mol %, greater than or equal to 0.4 mol % and less than or equal to 2 mol %, greater than or equal to 0.4 mol % and less than or equal to 1.5 mol %, greater than or equal to 0.4 mol % and less than or equal to 1 mol %, greater than or equal to 0.4 mol % and less than or equal to 0.75 mol %, or even greater than or equal to 0.4 mol % and less than or equal to 0.5 mol %, or any and all sub-ranges formed from any of these endpoints.

The sum of all alkali oxides is expressed herein as $R_2O$. Specifically, $R_2O$ is the sum (in mol %) of $Li_2O$, $Na_2O$, and $K_2O$ present in the glass composition and the resultant colored glass article (i.e., $R_2O=Li_2O$ (mol %)+$Na_2O$ (mol %)+$K_2O$ (mol %). Like $B_2O_3$, the alkali oxides aid in decreasing the softening point and molding temperature of the glass composition, thereby offsetting the increase in the softening point and molding temperature of the glass composition due to higher amounts of $SiO_2$ in the glass composition, for example. The softening point and molding temperature may be further reduced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than $100 \times 10^{-7}/°$ C., which may be undesirable.

In embodiments, the concentration of $R_2O$ in the glass composition and the resultant colored glass article may be greater than or equal to 10.3 mol %, greater than or equal to 11 mol %, greater than or equal to 12 mol %, greater than or equal to 13 mol %, or even greater than or equal to 14 mol. In embodiments, the concentration of $R_2O$ in the glass composition and the resultant colored glass article may be less than or equal to 22 mol %, less than or equal to 21 mol %, less than or equal to 20 mol %, less than or equal to 19 mol %, or even less than or equal to 18 mol %. In embodiments, the concentration of $R_2O$ in the glass composition and the resultant colored glass article may be greater than or equal to 10.3 mol % and less than or equal to 22 mol %, greater than or equal to 10.3 mol % and less than or equal to 21 mol %, greater than or equal to 10.3 mol % and less than or equal to 20 mol %, greater than or equal to 10.3 mol % and less than or equal to 19 mol %, greater than or equal to 10.3 mol % and less than or equal to 18 mol %, greater than or equal to 11 mol % and less than or equal to 22 mol %, greater than or equal to 11 mol % and less than or equal to 21 mol %, greater than or equal to 11 mol % and less than or equal to 20 mol %, greater than or equal to 11 mol % and less than or equal to 19 mol %, greater than or equal to 11 mol % and less than or equal to 18 mol %, greater than or equal to 12 mol % and less than or equal to 22 mol %, greater than or equal to 12 mol % and less than or equal to 21 mol %, greater than or equal to 12 mol % and less than or equal to 20 mol %, greater than or equal to 12 mol % and less than or equal to 19 mol %, greater than or equal to 12 mol % and less than or equal to 18 mol %, greater than or equal to 13 mol % and less than or equal to 22 mol %, greater than or equal to 13 mol % and less than or equal to 21 mol %, greater than or equal to 13 mol % and less than or equal to 20 mol %, greater than or equal to 13 mol % and less than or equal to 19 mol %, greater than or equal to 13 mol % and less than or equal to 18 mol %, greater than or equal to 14 mol % and less than or equal to 22 mol %, greater than or equal to 14 mol % and less than or equal to 21 mol %, greater than or equal to 14 mol % and less than or equal to 20 mol %, greater than or equal to 14 mol % and less than or equal to 19 mol %, or even greater than or equal to 14 mol % and less than or equal to 18 mol %, or any and all sub-ranges formed from any of these endpoints.

The glass compositions and the resultant colored glass articles described herein may further comprise MgO. MgO lowers the viscosity of the glass compositions, which enhances the formability, the strain point, and the Young's modulus, and may improve the ion-exchangeability. However, when too much MgO is added to the glass composition, the diffusivity of sodium and potassium ions in the glass composition decreases which, in turn, adversely impacts the ion-exchange performance (i.e., the ability to ion-exchange) of the resultant colored glass article.

In embodiments, the glass composition and the resultant colored glass article may comprise greater than or equal to 0 mol % and less than or equal to 4.5 mol % MgO. In embodiments, the concentration of MgO in the glass composition may be greater than or equal to 0 mol %, greater than or equal to 0.5 mol %, greater than or equal to 1 mol %, greater than or equal to 1.5 mol %, or even greater than or equal to 2 mol %. In embodiments, the concentration of MgO in the glass composition may be less than or equal to 4.5 mol %, less than or equal to 4 mol %, less than or equal to 3.5 mol %, or even less than or equal to 3 mol %. In embodiments, the concentration of MgO in the glass composition may be greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0 mol % and less than or equal to 3 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1 mol % and less than or equal to 3 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 1.5 mol % and less than or equal to 3 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, or even greater than or equal to 2 mol % and less than or equal to 3 mol %, or any and all sub-ranges formed from any of these endpoints.

The glass compositions and the resultant colored glass articles described herein may further comprise ZnO. ZnO lowers the viscosity of the glass compositions, which enhances the formability, the strain point, and the Young's modulus, and may improve the ion-exchangeability. However, when too much ZnO is added to the glass composition, the diffusivity of sodium and potassium ions in the glass composition decreases which, in turn, adversely impacts the ion-exchange performance (i.e., the ability to ion-exchange) of the resultant colored glass article.

In embodiments, the glass composition and the resultant colored glass article may comprise greater than or equal to 0 mol % and less than or equal to 4.5 mol % ZnO. In embodiments, the concentration of ZnO in the glass composition may be greater than or equal to 0 mol %, greater than or equal to 0.5 mol %, greater than or equal to 1 mol %, greater than or equal to 1.5 mol %, or even greater than or equal to 2 mol %. In embodiments, the concentration of ZnO in the glass composition may be less than or equal to 4.5 mol %, less than or equal to 4 mol %, less than or equal to 3.5 mol %, or even less than or equal to 3 mol %. In embodiments, the concentration of ZnO in the glass composition may be greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0 mol % and less than or equal to 3 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1 mol % and less than or equal to 3 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 1.5 mol % and less than or equal to 3 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, or even greater than or equal to 2 mol % and less than or equal to 3 mol %, or any and all sub-ranges formed from any of these endpoints.

In embodiments, the sum of MgO and ZnO present in the glass composition and the resultant colored glass article (i.e., MgO (mol %)+ZnO (mol %)) may be greater than or equal to 0 mol % and less than or equal to 4.5 mol % to avoid the formation of Cr-spinel crystals, thereby increasing $Cr_2O_3$ solubility and expanding the color gamut that may be achieved by the resultant colored glass articles.

In embodiments, the sum of MgO and ZnO in the glass compositions and the resultant colored glass article may be greater than or equal to 0 mol % and less than or equal to 1 mol %. In embodiments, the sum of MgO and ZnO in the glass composition and the resultant colored glass article may be greater than or equal to 1 mol % and less than or equal to 4.5 mol %. In embodiments, the sum of MgO and ZnO in the glass composition and the resultant colored glass article may be greater than or equal to 0 mol %, greater than or equal to 0.5 mol %, greater than or equal to 1 mol %, greater than or equal to 1.5 mol %, greater than or equal to 2 mol %, greater than or equal to 2.5 mol %, or even greater than or equal to 3 mol %. In embodiments, the sum of MgO and ZnO in the glass composition and the resultant colored glass article may be less than or equal to 4.5 mol %, less than or equal to 4.25 mol %, or even less than or equal to 4 mol %. In embodiments, the sum of MgO and ZnO in the glass composition and the resultant colored glass article may be greater than or equal to 0 mol % and less than or equal to 4.5 mol %, greater than or equal to 0 mol % and less than or equal to 4.25 mol %, greater than or equal to 0 mol % and less than or equal to 4 mol %, greater than or equal to 0.5 mol % and less than or equal to 4.5 mol %, greater than or equal to 0.5 mol % and less than or equal to 4.25 mol %, greater than or equal to 0.5 mol % and less than or equal to 4 mol %, greater than or equal to 1 mol % and less than or equal to 4.5 mol %, greater than or equal to 1 mol % and less than or equal to 4.25 mol %, greater than or equal to 1 mol % and less than or equal to 4 mol %, greater than or equal to 1.5 mol % and less than or equal to 4.5 mol %, greater than or equal to 1.5 mol % and less than or equal to 4.25 mol %, greater than or equal to 1.5 mol % and less than or equal to 4 mol %, greater than or equal to 2 mol % and less than or equal to 4.5 mol %, greater than or equal to 2 mol % and less than or equal to 4.25 mol %, greater than or equal to 2 mol % and less than or equal to 4 mol %, greater than or equal to 2.5 mol % and less than or equal to 4.5 mol %, greater than or equal to 2.5 mol % and less than or equal to 4.25 mol %, greater than or equal to 2.5 mol % and less than or equal to 4 mol %, greater than or equal to 3 mol % and less than or equal to 4.5 mol %, greater than or equal to 3 mol % and less than or equal to 4.25 mol %, or even greater than or equal to 3 mol % and less than or equal to 4 mol %, or any and all sub-ranges formed from any of these endpoints.

In embodiments, the sum of $Al_2O_3$, MgO, and ZnO present in the glass composition and the resultant colored glass article (i.e., $Al_2O_3$ (mol %)+MgO (mol %)+ZnO (mol %)) may be greater than or equal to 12 mol % and less than or equal to 22 mol % to avoid the formation of Cr-spinel crystals, thereby increasing $Cr_2O_3$ solubility and expanding the color gamut that may be achieved by the resultant colored glass articles.

In embodiments, the sum of $Al_2O_3$, MgO, and ZnO in the glass composition and the resultant colored glass article may be greater than or equal to 13 mol % and less than or equal to 21.5 mol %. In embodiments, the sum of $Al_2O_3$, MgO, and ZnO in the glass composition and the resultant colored glass article may be greater than or equal to 12 mol %, greater than or equal to 13 mol %, greater than or equal to 14 mol %, greater than or equal to 15 mol %, or even greater than or equal to 16 mol %. In embodiments, the sum of $Al_2O_3$, MgO, and ZnO in the glass composition and the resultant colored glass article may be less than or equal to 22 mol %, less than or equal to 21.5 mol %, less than or equal to 21 mol %, less than or equal to 20.5 mol %, or even less than or equal to 20 mol %. In embodiments, the sum of $Al_2O_3$, MgO, and ZnO in the glass composition and the resultant colored glass article may be greater than or equal to 12 mol % and less than or equal to 22 mol %, greater than or equal to 12 mol % and less than or equal to 21.5 mol %, greater than or equal to 12 mol % and less than or equal to 21 mol %, greater than or equal to 12 mol % and less than or equal to 20.5 mol %, greater than or equal to 12 mol % and less than or equal to 20 mol %, greater than or equal to 13 mol % and less than or equal to 22 mol %, greater than or equal to 13 mol % and less than or equal to 21.5 mol %, greater than or equal to 13 mol % and less than or equal to 21 mol %, greater than or equal to 13 mol % and less than or equal to 20.5 mol %, greater than or equal to 13 mol % and less than or equal to 20 mol %, greater than or equal to 14 mol % and less than or equal to 22 mol %, greater than or equal to 14 mol % and less than or equal to 21.5 mol %, greater than or equal to 14 mol % and less than or equal to 21 mol %, greater than or equal to 14 mol % and less than or equal to 20.5 mol %, greater than or equal to 15 mol % and less than or equal to 20 mol %, greater than or equal to 15 mol % and less than or equal to 22 mol %, greater than or equal to 15 mol % and less than or equal to 21.5 mol %, greater than or equal to 15 mol % and less than or equal to 21 mol %, greater than or equal to 15 mol % and less than or equal to 20.5 mol %, greater than or equal to 15 mol % and less than or equal to 20 mol %, greater than or equal to 16 mol % and less than or equal to 22 mol %, greater than or equal to 16 mol % and less than or equal to 21.5 mol %, greater than or equal to 16 mol % and less than or equal to 21 mol %, greater than or equal to 16 mol % and less than or equal to 20.5 mol %, or even greater than or equal to 16 mol % and less than or equal to 20 mol %, or any and all sub-ranges formed from any of these endpoints.

The glass compositions and the resultant colored glass articles described herein may further comprise CaO. CaO lowers the viscosity of a glass composition, which enhances the formability, the strain point and the Young's modulus, and may improve the ion-exchangeability. However, when too much CaO is added to the glass composition, the diffusivity of sodium and potassium ions in the glass composition decreases which, in turn, adversely impacts the ion-exchange performance (i.e., the ability to ion-exchange) of the resultant glass.

In embodiments, the glass composition and the resultant colored glass article may comprise greater than or equal to 0 mol % and less than or equal to 2 mol % CaO. In embodiments, the concentration of CaO in the glass composition and the resultant colored glass article may be greater than or equal to 0 mol %, greater than or equal to 0.25 mol %, greater than or equal to 0.5 mol %, or even greater than or equal to 0.75 mol %. In embodiments, the concentration of CaO in the glass composition and the resultant colored glass article may be less than or equal to 2 mol %, less than or equal to 1.75 mol %, less than or equal to 1.5 mol %, less than or equal to 1.25 mol %, or even less than or equal to 1 mol %. In embodiments, the concentration of CaO in the glass composition and the resultant colored glass article may be greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0 mol % and less than or equal to 1 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.25 mol % and less than or equal to 1 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.5 mol % and less than or equal to 1 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, greater than or equal to 0.75 mol % and less than or equal to 1.25 mol %, or even greater than or equal to 0.75 mol % and less than or equal to 1 mol %, or any and all sub-ranges formed from any of these endpoints.

The sum of all divalent cation oxides is expressed herein as RO. Specifically, RO is the sum (in mol %) of MgO, ZnO, and CaO (i.e. RO=MgO (mol %)+ZnO (mol %)+CaO (mol %)). In embodiments, the concentration of RO in the glass composition and the resultant colored glass article may be greater than or equal to 0 mol %, greater than or equal to 0.5 mol %, greater than or equal to 1 mol %, greater than or equal to 1.5 mol %, greater than or equal to 2 mol %, or even greater than or equal to 2.5 mol %. In embodiments, the concentration of RO in the glass composition and the resultant colored glass article may be less than or equal to 5 mol %, less than or equal to 4.5 mol %, less than or equal to 4 mol %, or even less than or equal to 3.5 mol %. In embodiments, the concentration of RO in the glass composition and the resultant colored glass article may be greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1.5 mol % and less than or equal to 5 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 2 mol % and less than or equal to 5 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, greater than or equal to 2.5 mol % and less than or equal to 5 mol %, greater than or equal to 2.5 mol % and less than or equal to 4.5 mol %, greater than or equal to 2.5 mol % and less than or equal to 4 mol %, or even greater than or equal to 2.5 mol % and less than or equal to 3.5 mol %, or any and all sub-ranges formed from any of these endpoints.

In embodiments, the glass compositions and the resultant colored glass articles are per-alkali (i.e., $R_2O$ (mol %)+RO (mol %)−$Al_2O_3$ (mol %) is greater than or equal to 0.5 mol %) to increase the solubility of $Cr_2O_3$ and avoid Cr-spinel crystal formation. However, when the glass composition has an excessive amount of alkali after charge balancing $Al_2O_3$, the alkali may form non-bridging oxygen around $SiO_2$, which degrades fracture toughness. Accordingly, $R_2O$+RO−$Al_2O_3$ in the glass composition and the resultant colored glass article may be limited (e.g., less than or equal to 6 mol %) to prevent a reduction in fracture toughness.

In embodiments, $R_2O$+RO−$Al_2O_3$ in the glass composition and the resultant colored glass article may be greater than or equal to 0.5 mol % and less than or equal to 6 mol %. In embodiments, $R_2O$+RO−$Al_2O_3$ in the glass composition and the resultant colored glass article may be greater than or equal to 1 mol % and less than or equal to 5.5 mol %. %. In embodiments, $R_2O$+RO−$Al_2O_3$ in the glass composition and the colored resultant glass article may be greater than or equal to 0.5 mol %, greater than or equal to 1 mol %, greater than or equal to 1.5 mol %, or even greater than or equal to 2 mol %. In embodiments, $R_2O$+RO−$Al_2O_3$ in the glass composition and the resultant colored glass article may be less than or equal to 6 mol %, less than or equal to 5.5 mol %, less than or equal to 5 mol %, less than or equal to 4.5 mol %, less than or equal to 4 mol %, less than or equal to 3.5 mol %, or even less than or equal to 3 mol %. In embodiments, $R_2O$+RO−$Al_2O_3$ in the glass composition and the resultant colored glass article may be greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 0.5 mol % and less than or equal to 3 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1 mol % and less than or equal to 3 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 1.5 mol % and less than or equal to 3 mol %, greater than or equal to 2 mol % and less than or equal to 6 mol %, greater than or equal to 2 mol % and less than or equal to 5.5 mol %, greater than or equal to 2 mol % and less than or equal to 5 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, or even greater than or equal to 2 mol % and less than or equal to 3 mol %, or any and all sub-ranges formed from any of these endpoints.

In embodiments, the glass compositions and the resultant colored glass articles described herein may satisfy only one of the following conditions and achieve the desired color: (1) less than or equal to 17.5 mol % $Al_2O_3$ and/or $R_2O$+RO−$Al_2O_3$ greater than or equal to 0.5 mol %; (2) $Al_2O_3$+MgO+ZnO less than or equal to 22 mol %; and (3) MgO+ZnO less than or equal to 4.5 mol %.

The glass compositions and the resultant colored glass articles described herein further comprise $Cr_2O_3$ as a colorant to achieve the desired color. As described herein, the glass compositions and the resultant colored glass articles described herein improve the solubility of $Cr_2O_3$, thereby expanding the color gamut achievable by the resultant colored glass articles.

In embodiments, the glass composition and the resultant colored glass article may comprise greater than 0 mol % and less than or equal to 2 mol % $Cr_2O_3$. In embodiments, the glass composition and the resultant colored glass article may comprise greater than 0.001 mol % and less than or equal to 1.5 mol % $Cr_2O_3$. In embodiments, the concentration of $Cr_2O_3$ in the glass composition and the resultant colored glass article may be greater than 0 mol %, greater than or equal to 0.001 mol %, greater than or equal to 0.005 mol %, greater than or equal to 0.01 mol %, or even greater than or equal to 0.05 mol %. In embodiments, the concentration of $Cr_2O_3$ in the glass composition and the resultant colored glass article may be less than or equal to 2 mol %, less than or equal to 1.5 mol %, less than or equal to 1 mol %, less than or equal to 0.5 mol %, or even less than or equal to 0.1 mol %. In embodiments, the concentration of $Cr_2O_3$ in the glass composition and the resultant colored glass article may be greater than 0 mol % and less than or equal to 2 mol %, greater than 0 mol % and less than or equal to 1.5 mol %, greater than 0 mol % and less than or equal to 1 mol %, greater than 0 mol % and less than or equal to 0.5 mol %, greater than 0 mol % and less than or equal to 0.1 mol %, greater than or equal to 0.001 mol % and less than or equal to 2 mol %, greater than or equal to 0.001 mol % and less than or equal to 1.5 mol %, greater than or equal to 0.001 mol % and less than or equal to 1 mol %, greater than or equal to 0.001 mol % and less than or equal to 0.5 mol %, greater than or equal to 0.001 mol % and less than or equal to 0.1 mol %, greater than or equal to 0.005 mol % and less than or equal to 2 mol %, greater than or equal to 0.005 mol % and less than or equal to 1.5 mol %, greater than or equal to 0.005 mol % and less than or equal to 1 mol %, greater than or equal to 0.005 mol % and less than or equal to 0.5 mol %, greater than or equal to 0.005 mol % and less than or equal to 0.1 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.5 mol %, greater than or equal to 0.01 mol % and less than or equal to 0.1 mol %, greater than or equal to 0.05 mol % and less than or equal to 2 mol %, greater than or equal to 0.05 mol % and less than or equal to 1.5 mol %, greater than or equal to 0.05 mol % and less than or equal to 1 mol %, greater than or equal to 0.05 mol % and less than or equal to 0.5 mol %, or even greater than or equal to 0.05 mol % and less than or equal to 0.1 mol %, or any and all sub-ranges formed from any of these endpoints.

Different color gamuts may be achieved by including other colorants in addition to $Cr_2O_3$. Accordingly, in embodiments, the glass composition and resultant colored glass article may comprise NiO, $Co_3O_4$, CuO, or combinations thereof.

In embodiments, the glass composition and the resultant colored glass article may comprise greater than or equal to 0 mol % and less than or equal to 4 mol % NiO. In embodiments, the concentration of NiO in the glass composition and the resultant colored glass article may be greater than or equal to 0 mol %, greater than or equal to 0.01 mol %, or even greater than or equal to 0.05 mol %. In embodiments, the concentration of NiO in the glass composition and the resultant colored glass article may be less than or equal to 4 mol %, less than or equal to 3 mol %, less than or equal to 2 mol %, less than or equal to 1 mol %, less than or equal to 0.5 mol %, less than or equal to 0.25 mol %, or even less than or equal to 0.1 mol %. In embodiments, the concentration of NiO in the glass composition and the resultant colored glass article may be greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1 mol %, greater than or equal to 0 mol % and less than or equal to 0.5 mol %, greater than or equal to 0 mol % and less than or equal to 0.25 mol %, greater than or equal to 0 mol % and less than or equal to 0.1 mol %, greater than or equal to 0.01 mol % and less than or equal to 4 mol %, greater than or equal to 0.01 mol % and less than or equal to 3 mol %, greater than or equal to 0.01 mol % and less than or equal to 2 mol %, greater than or equal to 0.01 mol % and less than or equal to 1 mol %, greater than or equal to 0.01 mol % and less than or equal to 0.5 mol %, greater than or equal to 0.01 mol % and less than or equal to 0.25 mol %, greater than or equal to 0.01 mol % and less than or equal to 0.1 mol %, greater than or equal to 0.05 mol % and less than or equal to 4 mol %, greater than or equal to 0.05 mol % and less than or equal to 3 mol %, greater than or equal to 0.05 mol % and less than or equal to 2 mol %, greater than or equal to 0.05 mol % and less than or equal to 1 mol %, greater than or equal to 0.05 mol % and less than or equal to 0.5 mol %, greater than or equal to 0.05 mol % and less than or equal to 0.25 mol %, or even greater than or equal to 0.05 mol % and less than or equal to 0.1 mol %, or any and all sub-ranges formed between any of these endpoints.

In embodiments, the glass composition and the resultant colored glass article may comprise greater than or equal to 0 mol % and less than or equal to 2 mol % $Co_3O_4$. In embodiments, the concentration of $Co_3O_4$ in the glass composition and the resultant colored glass article may be greater than or equal to 0 mol %, greater than or equal to 0.001 mol %, greater than or equal to 0.005 mol %, or even greater than or equal to 0.01 mol %. In embodiments, the concentration of $Co_3O_4$ in the glass composition and the resultant colored glass article may be less than or equal to 2 mol %, less than or equal to 1.5 mol %, less than or equal to 1 mol %, less than or equal to 0.5 mol %, less than or equal to 0.1 mol %, or even less than or equal to 0.05 mol %. In embodiments, the concentration of $Co_3O_4$ in the glass composition and the resultant colored glass article may greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.5 mol %, greater than or equal to 0 mol % and less than or equal to 0.1 mol %, greater than or equal to 0 mol % and less than or equal to 0.05 mol %, greater than or equal to 0.001 mol % and less than or equal to 2 mol %, greater than or equal to 0.001 mol % and less than or equal to 1.5 mol %, greater than or equal to 0.001 mol % and less than or equal to 1 mol %, greater than or equal to 0.001 mol % and less than or equal to 0.5 mol %, greater than or equal to 0.001 mol % and less than or equal to 0.1 mol %, greater than or equal to 0.001 mol % and less than or equal to 0.05 mol %, greater than or equal to 0.005 mol % and less than or equal to 2 mol %, greater than or equal to 0.005 mol % and less than or equal to 1.5 mol %, greater than or equal to 0.005 mol % and less than or equal to 1 mol %, greater than or equal to 0.005 mol % and less than or equal to 0.5 mol %, greater than or equal to 0.005 mol % and less than or equal to 0.1 mol %, greater than or equal to 0.005 mol % and less than or equal to 0.05 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.5 mol %, greater than or equal to 0.01 mol % and less than or equal to 0.1 mol %, or even greater than or equal to 0.01 mol % and less than or equal to 0.05 mol %, or any and all sub-ranges formed from any of these endpoints.

In embodiments, the glass composition and the resultant colored glass article may comprise greater than or 0 mol % and less than or equal to 20 mol % CuO. In embodiments, the concentration of CuO in the glass composition and the resultant colored glass article may be greater than or equal 0 mol %, greater than or equal to 0.05 mol %, greater than or equal to 0.1 mol %, greater than or equal to 0.5 mol %, or even greater than or equal to 1 mol %. In embodiments, the concentration of CuO in the glass composition and the resultant colored glass article may be less than or equal to 20 mol %, less than or equal to 15 mol %, less than or equal to 10 mol %, less than or equal to 5 mol %, less than or equal to 4 mol %, less than or equal to 3 mol %, or even less than or equal to 2 mol %. In embodiments, the concentration of CuO in the glass composition and the resultant colored glass article may be greater than or equal to 0 mol % and less than or equal to 20 mol %, greater than or equal to 0 mol % and less than or equal to 15 mol %, greater than or equal to 0 mol % and less than or equal to 10 mol %, greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0 mol % and less than or equal to 2 mol, greater than or equal to 0.05 mol % and less than or equal to 20 mol %, greater than or equal to 0.05 mol % and less than or equal to 15 mol %, greater than or equal to 0.05 mol % and less than or equal to 10 mol %, greater than or equal to 0.05 mol % and less than or equal to 5 mol %, greater than or equal to 0.05 mol % and less than or equal to 4 mol %, greater than or equal to 0.05 mol % and less than or equal to 3 mol %, greater than or equal to 0.05 mol % and less than or equal to 2 mol %, greater than or equal to 0.1 mol % and less than or equal to 20 mol %, greater than or equal to 0.1 mol % and less than or equal to 15 mol %, greater than or equal to 0.1 mol % and less than or equal to 10 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2 mol %, greater than or equal to 0.5 mol % and less than or equal to 20 mol %, greater than or equal to 0.5 mol % and less than or equal to 15 mol %, greater than or equal to 0.5 mol % and less than or equal to 10 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2 mol %, greater than or equal to 1 mol % and less than or equal to 20 mol %, greater than or equal to 1 mol % and less than or equal to 15 mol %, greater than or equal to 1 mol % and less than or equal to 10 mol %, greater than or equal to 1 mol % and less than or equal to 5 mol %, greater than or equal to 1 mol % and less than or equal to 4 mol %, greater than or equal to 1 mol % and less than or equal to 3 mol %, or even greater than or equal to 1 mol % and less than or equal to 2 mol %, or any and all sub-ranges formed from any of these endpoints.

In embodiments, the glass compositions and the resultant colored glass articles described herein may further include tramp materials such as $TiO_2$, MnO, $MoO_3$, $WO_3$, $Y_2O_3$, CdO, $As_2O_3$, $Sb_2O_3$, sulfur-based compounds, such as sulfates, halogens, or combinations thereof. In embodiments, antimicrobial components, chemical fining agents, or other additional components may be included in the glass compositions and the resultant colored glass articles.

In embodiments, a liquidus temperature of a glass composition may be greater than or equal to 1000° C., greater than or equal to 1050° C., or even greater than or equal to 1100° C. In embodiments, a liquidus temperature of the precursor glass composition may be less than or equal to 1400° C., less than or equal to 1350° C. or even less than or equal to 1300° C. In embodiments, a liquidus temperature of the precursor glass composition may be greater than or equal to 1000° C. and less than or equal to 1400° C., greater than or equal to 1000° C. and less than or equal to 1350° C., greater than or equal to 1000° C. and less than or equal to 1300° C., greater than or equal to 1050° C. and less than or equal to 1400° C., greater than or equal to 1050° C. and less than or equal to 1350° C., greater than or equal to 1000° C. and less than or equal to 1300° C., greater than or equal to 1100° C. and less than or equal to 1400° C., greater than or equal to 1100° C. and less than or equal to 1350° C., or even greater than or equal to 1100° C. and less than or equal to 1300° C., or any and all sub-ranges formed from any of these endpoints.

The colored glass articles formed from the glass compositions described herein may be any suitable thickness, which may vary depending on the particular application of the colored glass article. In embodiments, the glass sheet embodiments may have a thickness greater than or equal to 250 μm and less than or equal to 6 mm, greater than or equal to 250 μm and less than or equal to 4 mm, greater than or equal to 250 μm and less than or equal to 2 mm, greater than or equal to 250 μm and less than or equal to 1 mm, greater than or equal to 250 μm and less than or equal to 750 μm, greater than or equal to 250 μm and less than or equal to 500 μm, greater than or equal to 500 μm and less than or equal to 6 mm, greater than or equal to 500 μm and less than or equal to 4 mm, greater than or equal to 500 μm and less than or equal to 2 mm, greater than or equal to 500 μm and less than or equal to 1 mm, greater than or equal to 500 μm and less than or equal to 750 μm, greater than or equal to 750 μm and less than or equal to 6 mm, greater than or equal to 750 μm and less than or equal to 4 mm, greater than or equal to 750 μm and less than or equal to 2 mm, greater than or equal to 750 μm and less than or equal to 1 mm, greater than or equal to 1 mm and less than or equal to 6 mm, greater than or equal to 1 mm and less than or equal to 4 mm, greater than or equal to 1 mm and less than or equal to 2 mm, greater than or equal to 2 mm and less than or equal to 6 mm, greater than or equal to 2 mm and less than or equal to 4 mm, or even greater than or equal to 4 mm and less than or equal to 6 mm, or any and all sub-ranges formed from any of these endpoints.

As discussed hereinabove, colored glass articles formed from the glass compositions described herein may have an increased fracture toughness such that the colored glass articles are more resistant to damage. In embodiments, the colored glass article may have a $K_{1C}$ fracture toughness as measured by a double torsion method greater than or equal to 0.7 MPa·m$^{1/2}$. In embodiments, the colored glass article may have a $K_{1C}$ fracture toughness as measured by a double torsion method greater than or equal to 0.7 MPa·m$^{1/2}$, greater than or equal to 0.8 MPa·m$^{1/2}$, greater than or equal to 0.9 MPa·m$^{1/2}$, or even greater than or equal to 1.0 MPa·m$^{1/2}$.

In embodiments, the glass compositions described herein are ion-exchangeable to facilitate strengthening the colored glass article made from the glass compositions. In typical ion-exchange processes, smaller metal ions in the glass compositions are replaced or "exchanged" with larger metal ions of the same valence within a layer that is close to the outer surface of the glass article made from the glass composition. The replacement of smaller ions with larger ions creates a compressive stress within the layer of the glass article made from the glass composition. In embodiments, the metal ions are monovalent metal ions (e.g., Li$^+$, Na$^+$, K$^+$, and the like), and ion-exchange is accomplished by immersing the glass article made from the glass composition in a bath comprising at least one molten salt of the larger metal ion that is to replace the smaller metal ion in the glass article. Alternatively, other monovalent ions such as Ag$^+$, Tl$^+$, Cu$^+$, and the like may be exchanged for monovalent ions. The ion-exchange process or processes that are used to strengthen the glass article made from the glass composition may include, but are not limited to, immersion in a single bath or multiple baths of like or different compositions with washing and/or annealing steps between immersions. In embodiments, the glass articles made from the glass compositions may be ion-exchanged by exposure to molten NaNO$_3$ salt at a temperature of 500° C. In such embodiments, the Na$^+$ ions replace some portion of the Li$^+$ ions in the glass article to develop a surface compressive layer and exhibit high crack resistance. The resulting compressive stress layer may have a depth (also referred to as a "depth of compression" or "DOC") of at least 100 µm on the surface of the glass article in 2 hours. In embodiments, the bath further comprises molten KNO$_3$ salt.

In embodiments, a colored glass article made from a glass composition may be ion-exchanged to achieve a depth of compression of 10 µm or greater, 20 µm or greater, 30 µm or greater, 40 µm or greater, 50 µm or greater, 60 µm or greater, 70 µm or greater, 80 µm or greater, 90 µm or greater, or 100 µm or greater. In embodiments, the colored glass article made from the glass composition may have a thickness "t" and may be ion-exchanged to achieve a depth of compression greater than or equal to 0.15t, greater than or equal to 0.17t, or even greater than or equal to 0.2t. In embodiments, the colored glass article made from the glass composition may have a thickness "t" and may be ion-exchanged to achieve a depth of compression less than or equal to 0.3t, less than or equal to 0.27t, or even less than or equal to 0.25t. In embodiments, the colored glass article made from the glass composition described herein may have a thickness "t" and may be ion-exchanged to achieve a depth of compression greater than or equal to 0.15t and less than or equal to 0.3t, greater than or equal to 0.15t and less than or equal to 0.27t, greater than or equal to 0.15t and less than or equal to 0.25t, greater than or equal to 0.17t and less than or equal to 0.3t, greater than or equal to 0.17t and less than or equal to 0.27t, greater than or equal to 0.17t and less than or equal to 0.25t, greater than or equal to 0.2t and less than or equal to 0.3t, greater than or equal to 0.2t and less than or equal to 0.27t, or even greater than or equal to 0.2t and less than or equal to 0.25t, or any and all sub-ranges formed from any of these endpoints.

The development of this surface compression layer is beneficial for achieving a better crack resistance and higher flexural strength compared to non-ion-exchanged materials. The surface compression layer has a higher concentration of the ions exchanged into the colored glass article in comparison to the concentration of the ions exchanged into the colored glass article for the body (i.e., the area not including the surface compression) of the colored glass article. In embodiments, the colored glass article made from the glass composition may have a surface compressive stress after ion-exchange strengthening greater than or equal to 300 MPa, greater than or equal to 400 MPa, greater than or equal to 500 MPa, or even greater than greater than or equal to 600 MPa. In embodiments, the colored glass article made from the glass composition may have a surface compressive stress after ion-exchange strengthening less than or equal to 1 GPa, less than or equal to 900 MPa, or even less than or equal to 800 MPa. In embodiments, the colored glass article made from the glass composition may have a surface compressive stress after ion-exchange strengthening greater than or equal to 300 MPa and less than or equal to 1 GPa, greater than or equal to 300 MPa and less than or equal to 900 MPa, greater than or equal to 300 MPa and less than or equal to 800 MPa, greater than or equal to 400 MPa and less than or equal to 1 GPa, greater than or equal to 400 MPa and less than or equal to 900 MPa, greater than or equal to 400 MPa and less than or equal to 800 MPa, greater than or equal to 500 MPa and less than or equal to 1 GPa, greater than or equal to 500 MPa and less than or equal to 900 MPa, greater than or equal to 500 MPa and less than or equal to 800 MPa, greater than or equal to 600 MPa and less than or equal to 1 GPa, greater than or equal to 600 MPa and less than or equal to 900 MPa, greater than or equal to 600 MPa and less than or equal to 800 MPa, In embodiments, the colored glass articles made from the glass composition may have a central tension after ion-exchange strengthening greater than or equal to 40 MPa, greater than or equal to 60 MPa, greater than or equal to 80 MPa, or even greater than or equal to 100 MPa. In embodiments, the colored glass article made from the glass composition may have a central tension after ion-exchange strengthening less than or equal to 250 MPa, less than or equal to 200 MPa, or even less than or equal to 150 MPa. In embodiments, the colored glass article made from the glass composition may have a central tension after ion-exchange strengthening greater than or equal to 40 MPa and less than or equal to 250 MPa, greater than or equal to 40 MPa and less than or equal to 200 MPa, greater than or equal to 40 MPa and less than or equal to 150 MPa, greater than or equal to 60 MPa and less than or equal to 250 MPa, greater than or equal to 60 MPa and less than or equal to 200 MPa, greater than or equal to 60 MPa and less than or equal to 150 MPa, greater than or equal to 80 MPa and less than or equal to 250 MPa, greater than or equal to 80 MPa and less than or equal to 200 MPa, greater than or equal to 80 MPa and less than or equal to 150 MPa, greater than or equal to 100 MPa and less than or equal to 250 MPa, greater than or equal to 100 MPa and less than or equal to 200 MPa, or even greater than or equal to 100 MPa and less than or equal to 150 MPa, or any and all sub-ranges formed from any of these endpoints.

Figure 2:
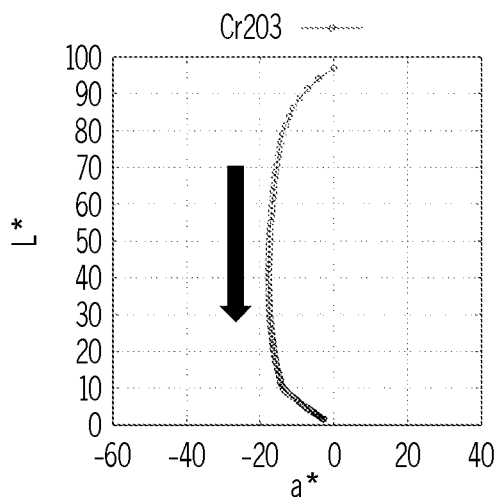
FIG. 2 is a plot of a projected a* vs. L* CIELAB space (x-axis: a*; y-axis: L*) of the colored glass article of FIG. 1.
Figure 3:
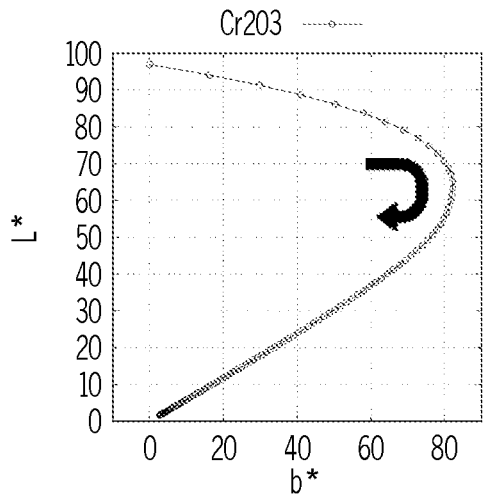
FIG. 3 is a plot of a projected b* vs. L* CIELAB space (x-axis: b*; y-axis: L*) of the colored glass article of FIG. 1.

As described herein, the glass compositions described herein increase the solubility of Cr$_2$O$_3$, which increases the amount of Cr$_2$O$_3$ present in the resultant colored glass articles, thereby expanding the color gamut achievable by the colored glass articles. Referring now to FIGS. 1-3, a projected color gamut for a glass composition including only Cr$_2$O$_3$ as a colorant is shown. As illustrated, a single colorant generates a line in the CIELAB color space. The points along the line correspond to different levels of Cr$_2$O$_3$ concentration from 0 mol % to 2 mol %. The arrows indicate the directions of increasing concentration. The $Cr_2O_3$ color gamut projects that a colored glass article having greater than or equal to 0 mol % and less than or equal to 2 mol % $Cr_2O_3$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −18 and less than or equal to 0, and b* greater than or equal to 0 and less than or equal to 82.

Figure 4:
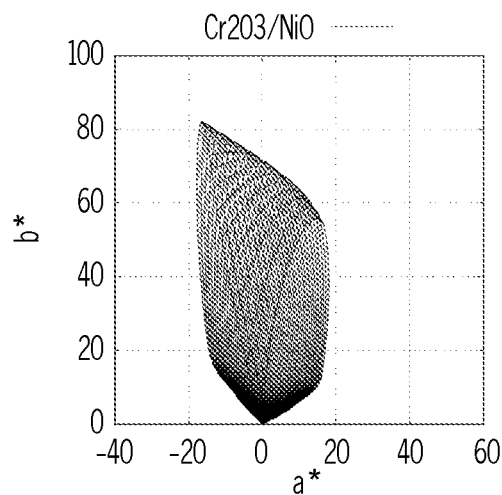
FIG. 4 is a plot of a projected a* vs. b* CIELAB space (x-axis: a*; y-axis: b*) of a colored glass article made from a glass composition according to one or more embodiments described herein.
Figure 5:
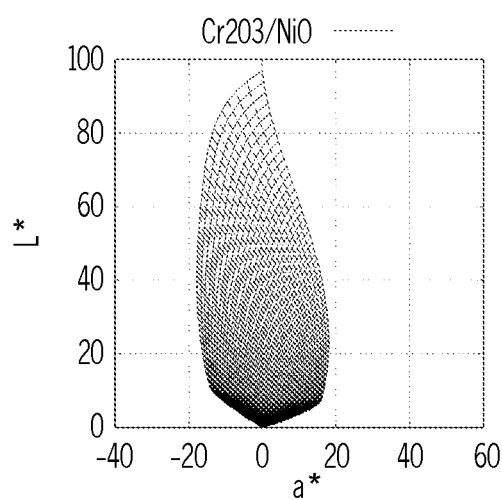
FIG. 5 is a plot of a projected a* vs. L* CIELAB space (x-axis: a*; y-axis: L*) of the colored glass article of FIG. 4.
Figure 6:
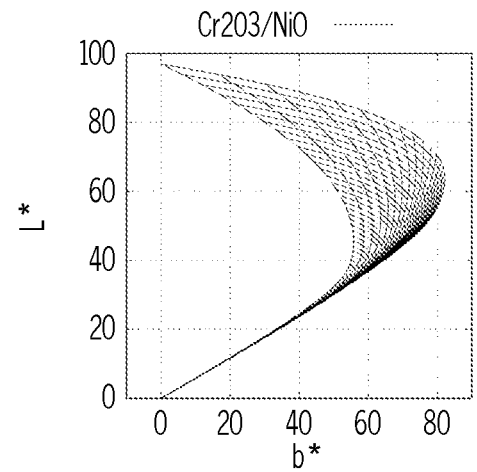
FIG. 6 is a plot of a projected b* vs. L* CIELAB space (x-axis: b*; y-axis: L*) of the colored glass article of FIG. 4.

Different color gamuts may be achieved by including other colorants in addition to $Cr_2O_3$. Referring now to FIGS. 4-6, a projected color gamut for a glass composition including $Cr_2O_3$ and NiO as colorants is shown. As illustrated, two colorants generate a surface in the CIELAB color space. The $Cr_2O_3$/NiO color gamut projects that a colored glass article having greater than or equal to 0 mol % and less than or equal to 2 mol % $Cr_2O_3$ and greater than or equal to 0 mol % and less than or equal to 4 mol % NiO may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −18 and less than or equal to 18, and b* greater than or equal to 0 and less than or equal to 82.

Figure 7:
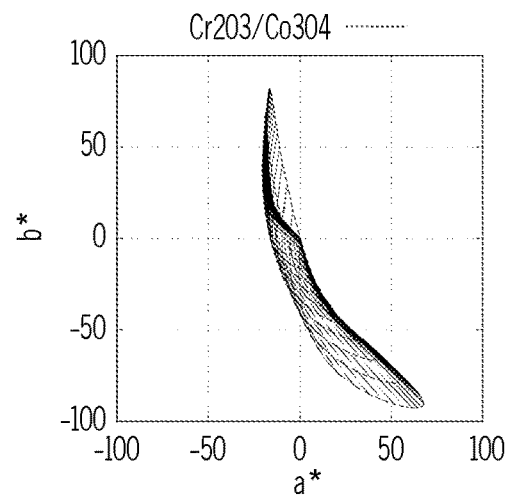
FIG. 7 is a plot of a projected a* vs. b* CIELAB space (x-axis: a*; y-axis: b*) of a colored glass article made from a glass composition according to one or more embodiments described herein.
Figure 8:
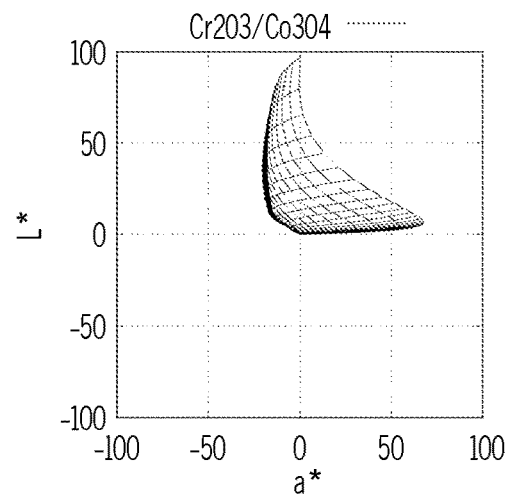
FIG. 8 is a plot of a projected a* vs. L* CIELAB space (x-axis: a*; y-axis: L*) of the colored glass article of FIG. 7.
Figure 9:
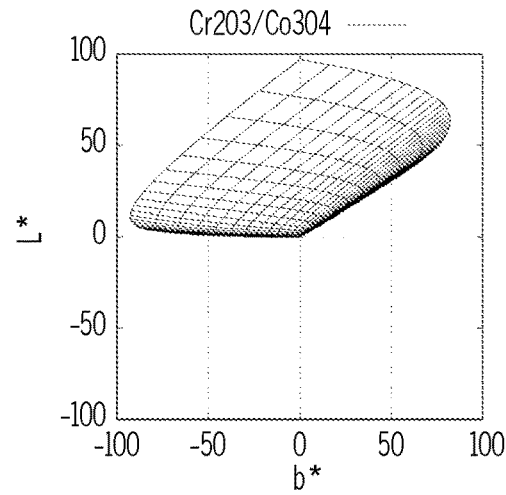
FIG. 9 is a plot of a projected b* vs. L* CIELAB space (x-axis: b*; y-axis: L*) of the colored glass article of FIG. 7.

Referring now to FIGS. 7-9, a projected color gamut for a glass composition including $Cr_2O_3$ and $Co_3O_4$ as colorants is shown. As illustrated, two colorants generate a surface in the CIELAB color space. The $Cr_2O_3$/$Co_3O_4$ color gamut projects that a colored glass article having greater than or equal to 0 mol % and less than or equal to 2 mol % $Cr_2O_3$ and greater than or equal to 0 mol % and less than or equal to 2 mol % $Co_3O_4$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −20 and less than or equal to 60, and b* greater than or equal to −90 and less than or equal to 85.

Figure 10:
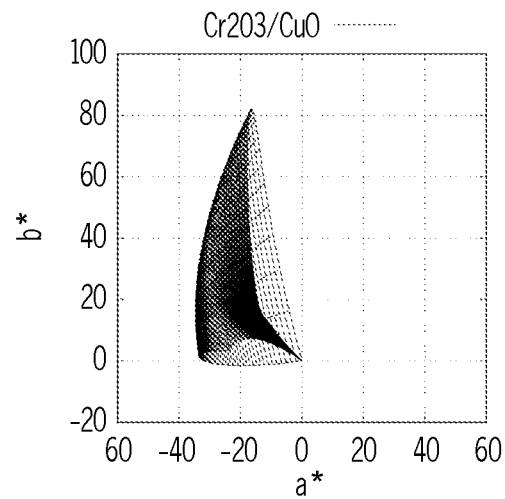
FIG. 10 is a plot of a projected a* vs. b* CIELAB space (x-axis: a*; y-axis: b*) of a colored glass article made from a glass composition according to one or more embodiments described herein.
Figure 11:
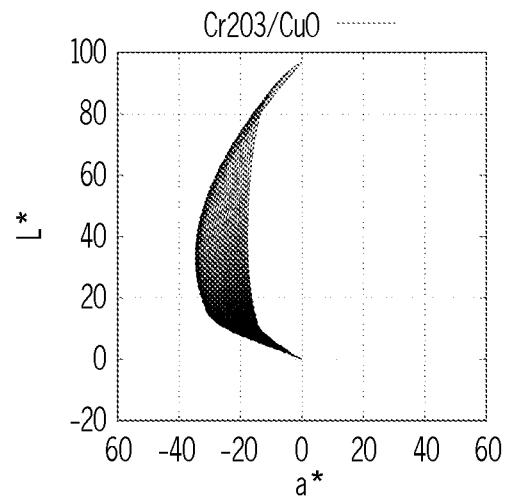
FIG. 11 is a plot of a projected a* vs. L* CIELAB space (x-axis: a*; y-axis: L*) of the colored glass article of FIG. 10.
Figure 12:
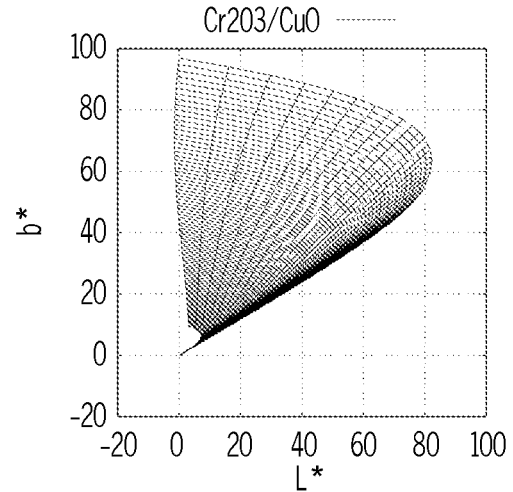
FIG. 12 is a plot of a projected b* vs. L* CIELAB space (x-axis: b*; y-axis: L*) of the colored glass article of FIG. 10.

Referring now to FIGS. 10-12, a projected color gamut for a glass composition including $Cr_2O_3$ and CuO as colorants is shown. As illustrated, two colorants generate a surface in the CIELAB color space. The $Cr_2O_3$/CuO color gamut projects that a colored glass article having greater than or equal to 0 mol % and less than or equal to 2 mol % $Cr_2O_3$ and greater than or equal to 0 mol % and less than or equal to 20 mol % CuO may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −35 and less than or equal to 0, and b* greater than or equal to 0 and less than or equal to 82.

Figure 13:
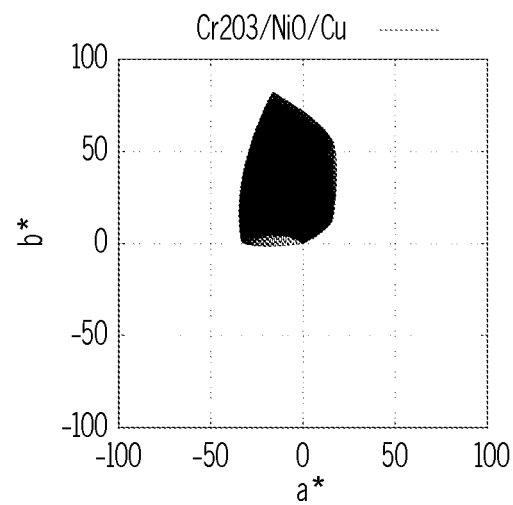
FIG. 13 is a plot of a projected a* vs. b* CIELAB space (x-axis: a*; y-axis: b*) of a colored glass article made from a glass composition according to one or more embodiments described herein.
Figure 14:
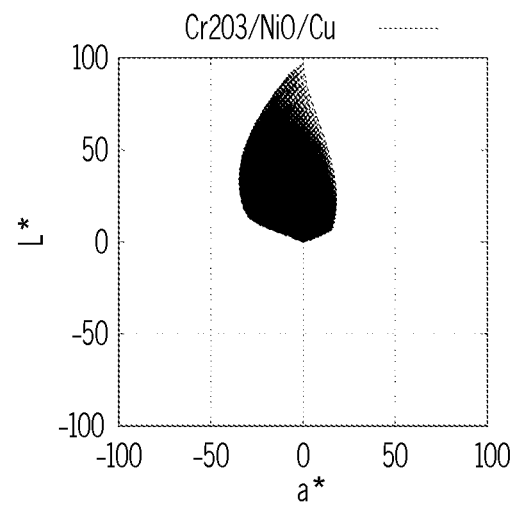
FIG. 14 is a plot of a projected a* vs. L* CIELAB space (x-axis: a*; y-axis: L*) of the colored glass article of FIG. 13.
Figure 15:
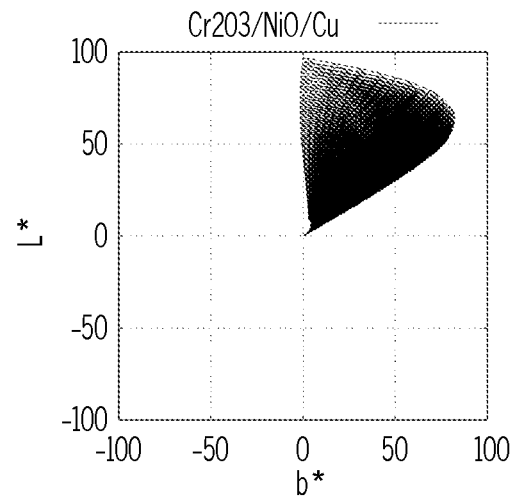
FIG. 15 is a plot of a projected b* vs. L* CIELAB space (x-axis: b*; y-axis: L*) of the colored glass article of FIG. 13.

Referring now to FIGS. 13-15, a projected color gamut for a glass composition including $Cr_2O_3$, NiO, and CuO as colorants is shown. As illustrated, three colorants create a volume in the CIELAB color space. The $Cr_2O_3$/NiO/CuO color gamut projects that a colored glass article having greater than or equal to 0 mol % and less than or equal to 2 mol % $Cr_2O_3$, greater than or equal to 0 mol % and less than or equal to 4 mol % NiO, and greater than or equal to 0 mol % and less than or equal to 20 mol % CuO may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −35 and less than or equal to 20, and b* greater than or equal to 0 and less than or equal to 75.

Figure 16:
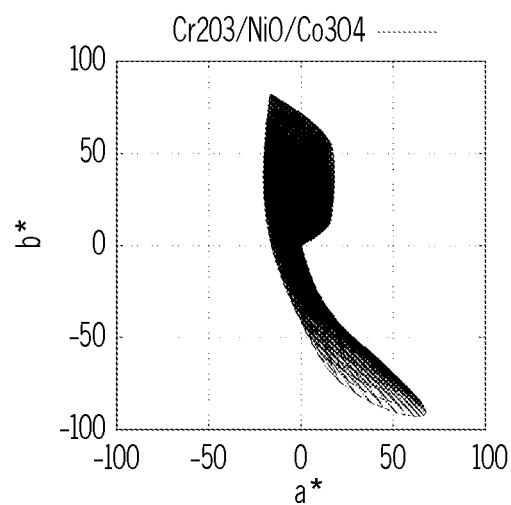
FIG. 16 is a plot of a projected a* vs. b* CIELAB space (x-axis: a*; y-axis: b*) of a colored glass article made from a glass composition according to one or more embodiments described herein.
Figure 17:
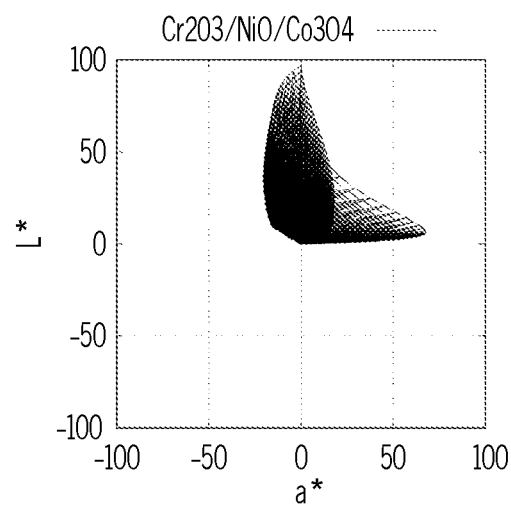
FIG. 17 is a plot of a projected a* vs. L* CIELAB space (x-axis: a*; y-axis: L*) of the colored glass article of FIG. 16.
Figure 18:
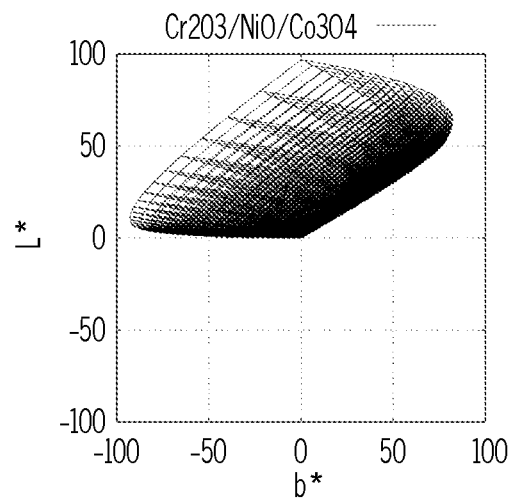
FIG. 18 is a plot of a projected b* vs. L* CIELAB space (x-axis: b*; y-axis: L*) of the colored glass article of FIG. 16.

Referring now to FIGS. 16-18, a projected color gamut for a glass composition including $Cr_2O_3$, NiO, and $Co_3O_4$ as colorants is shown. As illustrated, three colorants create a volume in the CIELAB color space. The $Cr_2O_3$/NiO/$Co_3O_4$ color gamut projects that a colored glass article having greater than or equal to 0 mol % and less than or equal to 2 mol % $Cr_2O_3$, greater than or equal to 0 mol % and less than or equal to 4 mol % NiO, and greater than or equal to 0 mol % and less than or equal to 2 mol % $Co_3O_4$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −15 and less than or equal to 65, and b* greater than or equal to −90 and less than or equal to 80.

Figure 19:
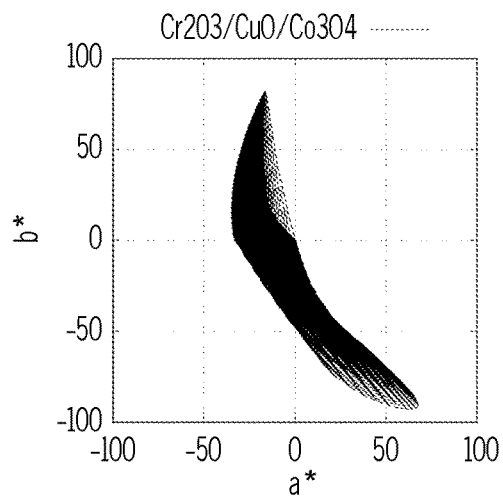
FIG. 19 is a plot of a projected a* vs. b* CIELAB space (x-axis: a*; y-axis: b*) of a colored glass article made from a glass composition according to one or more embodiments described herein.
Figure 20:
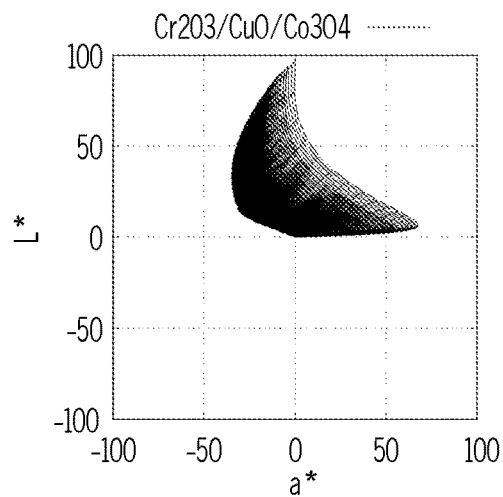
FIG. 20 is a plot of a projected a* vs. L* CIELAB space (x-axis: a*; y-axis: L*) of the colored glass article of FIG. 19.
Figure 21:
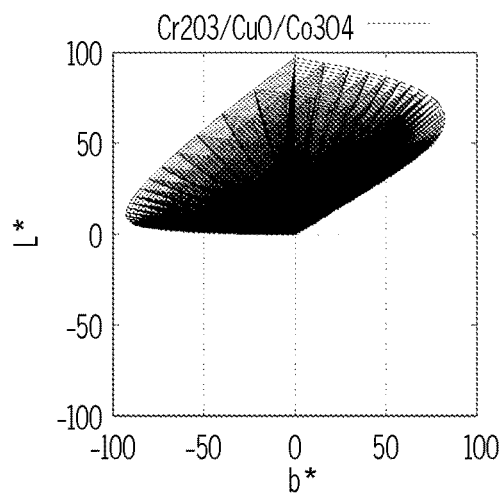
FIG. 21 is a plot of a projected b* vs. L* CIELAB space (x-axis: b*; y-axis: L*) of the colored glass article of FIG. 19.

Referring now to FIGS. 19-21, a projected color gamut for a glass composition including $Cr_2O_3$, CuO, and $Co_3O_4$ as colorants is shown. As illustrated, three colorants create a volume in the CIELAB color space. The $Cr_2O_3$/CuO/$Co_3O_4$ color gamut projects that a colored glass article having greater than or equal to 0 mol % and less than or equal to 2 mol % $Cr_2O_3$, greater than or equal to 0 mol % and less than or equal to 20 mol % CuO, and greater than or equal to 0 mol % and less than or equal to 2 mol % $Co_3O_4$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −35 and less than or equal to 60, and b* greater than or equal to −90 and less than or equal to 80.

Figure 22:
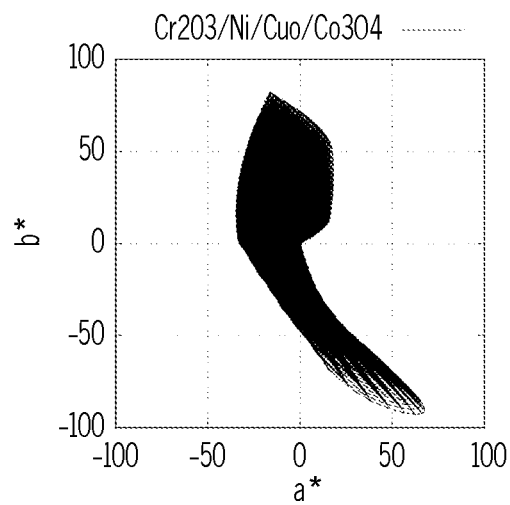
FIG. 22 is a plot of a projected a* vs. b* CIELAB space (x-axis: a*; y-axis: b*) of a colored glass article made from a glass composition according to one or more embodiments described herein.
Figure 23:
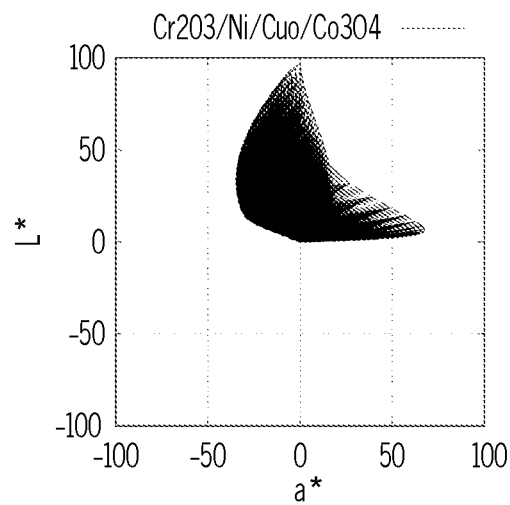
FIG. 23 is a plot of a projected a* vs. L* CIELAB space (x-axis: a*; y-axis: L*) of the colored glass article of FIG. 22.
Figure 24:
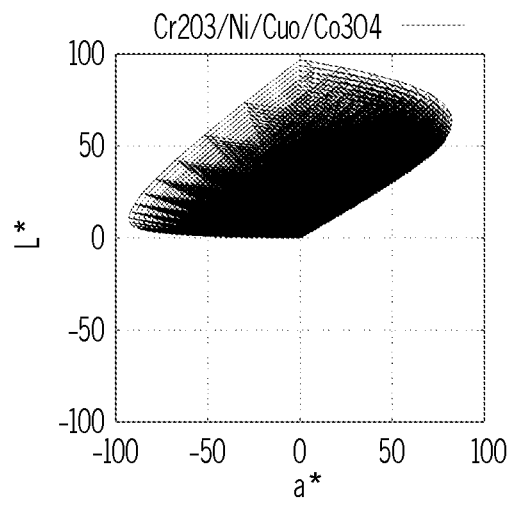
FIG. 24 is a plot of a projected b* vs. L* CIELAB space (x-axis: b*; y-axis: L*) of the colored glass article of FIG. 22.

Referring now to FIGS. 22-24, a projected color gamut for a glass composition including $Cr_2O_3$, NiO, CuO, and $Co_3O_4$ as colorants is shown. As illustrated, three colorants create an overlapping volume in the CIELAB color space. The $Cr_2O_3$/NiO/CuO/$Co_3O_4$ color gamut projects that a colored glass article having greater than or equal to 0 mol % and less than or equal to 2 mol % $Cr_2O_3$, greater than or equal to 0 mol % and less than or equal to 4 mol % NiO, greater than or equal to 0 mol % and less than or equal to 20 mol % CuO, and greater than or equal to 0 mol % and less than or equal to 2 mol % $Co_3O_4$ may have a transmittance color coordinate in the CIELAB color space, as measured at an article thickness of 1.5 mm under F2 illumination and a 10° standard observer angle, of L* greater than or equal to 0 and less than or equal to 100, a* greater than or equal to −35 and less than or equal to 60, and b* greater than or equal to −90 and less than or equal to 80.

Figure 25:
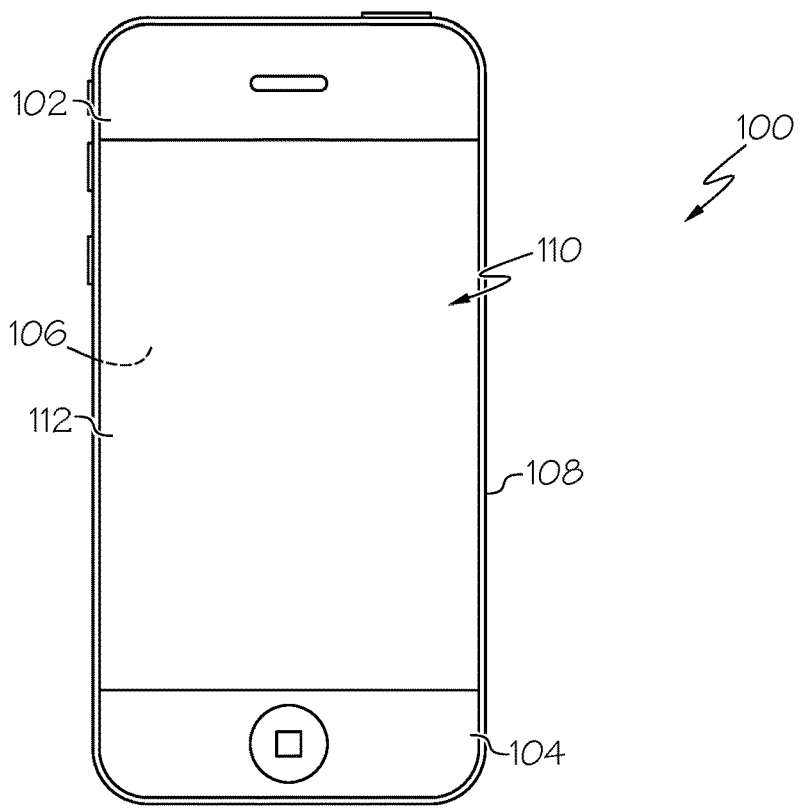
FIG. 25 is a plan view of an electronic device incorporating any of the colored glass articles according to one or more embodiments described herein.
Figure 26:
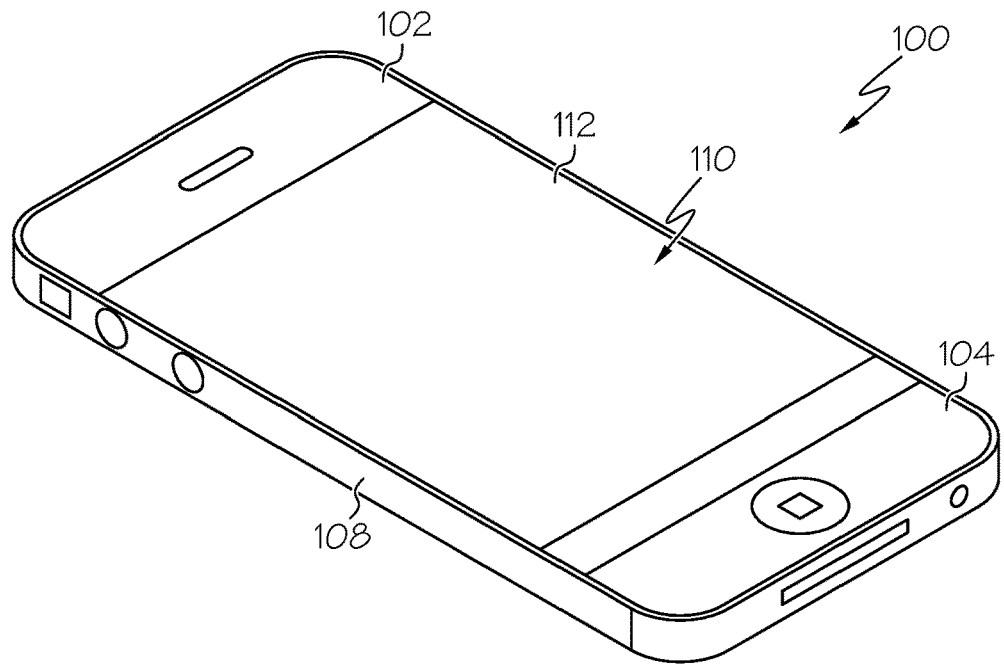
FIG. 26 is a perspective view of the electronic device of FIG. 25.

The colored glass articles described herein may be used for a variety of applications including, for example, back cover applications in consumer or commercial electronic devices such as smartphones, tablet computers, personal computers, ultrabooks, televisions, and cameras. An exemplary article incorporating any of the colored glass articles disclosed herein is shown in FIGS. 25 and 26. Specifically, FIGS. 25 and 26 show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, a portion of housing 102, such as the back 106, may include any of the colored glass articles disclosed herein.

EXAMPLES

In order that various embodiments be more readily understood, reference is made to the following examples, which illustrate various embodiments of the colored glass articles described herein.

Table 1 shows example glass compositions (in terms of mol %) and the transmittance color coordinate in the CIELAB color space, as measured at an article thickness of 1.5 mm under F2 illumination and a 10° standard observer angle, of the resultant colored glass articles.

TABLE 1

| Example | 1 | 2 | 3 | 4 | 5 | 6 |
|---|---|---|---|---|---|---|
| $SiO_2$ | 58.78 | 58.30 | 58.52 | 58.97 | 58.26 | 58.52 |
| $Al_2O_3$ | 16.68 | 16.35 | 16.50 | 16.41 | 16.38 | 16.56 |
| $B_2O_3$ | 5.93 | 5.93 | 6.01 | 5.98 | 5.93 | 6.04 |
| $Li_2O$ | 11.74 | 9.86 | 9.93 | 9.89 | 9.85 | 9.89 |
| $Na_2O$ | 6.26 | 4.25 | 4.27 | 4.27 | 4.26 | 4.30 |
| $K_2O$ | 0.48 | 0.48 | 0.48 | 0.49 | 0.48 | 0.49 |
| MgO | 0.02 | 2.91 | 2.95 | 2.91 | 2.94 | 2.93 |
| CaO | 0.01 | 0.01 | 0.01 | 0.01 | 0.01 | 0.02 |
| ZnO | — | 1 | 1.01 | 1 | 1 | 1.05 |
| $TiO_2$ | 0.01 | 0.01 | 0.01 | 0.01 | 0.01 | 0.01 |
| NiO | — | — | 0.023 | 0.012 | 0.043 | 0.089 |
| $Co_3O_4$ | — | 0.001 | 0.002 | 0.002 | 0.03 | 0.048 |
| CuO | — | 0.83 | 0.233 | 0.037 | 0.785 | 0.044 |
| $Cr_2O_3$ | 0.098 | 0.068 | 0.038 | 0.002 | 0.016 | 0.008 |
| $R_2O$ | 18.48 | 14.59 | 14.68 | 14.65 | 14.59 | 14.68 |
| RO | 0.03 | 3.92 | 3.97 | 3.92 | 3.95 | 4 |
| $R_2O$ + RO − $Al_2O_3$ | 1.83 | 2.16 | 2.15 | 2.16 | 2.16 | 2.12 |
| MgO + ZnO | 0.02 | 3.91 | 3.96 | 3.91 | 3.94 | 3.98 |
| $Al_2O_3$ + MgO + ZnO | 16.7 | 20.26 | 20.46 | 20.32 | 20.32 | 20.54 |
| Transmittance Color Coordinate | | | | | | |
| L* | 83.78 | 77.06 | 85.88 | 94.99 | 66.99 | 62.17 |
| a* | −12.60 | −26.24 | −9.49 | −0.45 | −10.12 | −2.12 |
| b* | 62.26 | 8.74 | 6.26 | 0.17 | −14.19 | −20.39 |

| Example | 7 | 8 | 9 | 10 | 11 | 12 |
|---|---|---|---|---|---|---|
| $SiO_2$ | 57.09 | 59.21 | 58.44 | 58.12 | 59.20 | 58.36 |
| $Al_2O_3$ | 16.10 | 16.64 | 16.21 | 16.56 | 16.58 | 16.11 |
| $B_2O_3$ | 5.90 | 5.62 | 5.70 | 6.07 | 5.67 | 5.69 |
| $Li_2O$ | 9.68 | 11.75 | 11.56 | 11.83 | 11.82 | 11.6 |
| $Na_2O$ | 4.21 | 6.18 | 6.09 | 6.21 | 6.16 | 6.07 |
| $K_2O$ | 0.47 | 0.47 | 0.47 | 0.48 | 0.45 | 0.46 |
| MgO | 2.86 | 0.02 | 0.02 | 0.02 | 0.02 | 0.02 |
| CaO | 0.02 | 0.01 | 0.01 | 0.01 | 0.01 | 0.01 |
| ZnO | 0.98 | — | — | — | — | — |
| $TiO_2$ | — | 0.01 | — | 0.01 | 0.01 | — |
| NiO | 0.014 | 0.078 | 0.039 | 0.071 | — | — |
| $Co_3O_4$ | 0.058 | 0.001 | 0.001 | 0.002 | 0.002 | 0.038 |
| CuO | 2.598 | 0.002 | 1.351 | 0.563 | 0.086 | 1.583 |
| $Cr_2O_3$ | 0.006 | 0.009 | 0.102 | 0.051 | 0.002 | 0.051 |
| $R_2O$ | 14.36 | 18.4 | 18.12 | 18.52 | 18.43 | 18.13 |
| RO | 3.86 | 0.03 | 0.03 | 0.03 | 0.03 | 0.03 |
| $R_2O$ + RO − $Al_2O_3$ | 2.12 | 1.79 | 1.94 | 1.99 | 1.88 | 2.05 |
| MgO + ZnO | 3.84 | 0.02 | 0.02 | 0.02 | 0.02 | 0.02 |
| $Al_2O_3$ + MgO + ZnO | 19.94 | 16.66 | 16.23 | 16.58 | 16.6 | 16.13 |
| Transmittance Color Coordinate | | | | | | |
| L* | 38.41 | 89.31 | 89.27 | 76.84 | 94.52 | 41.28 |
| a* | −14.36 | −0.65 | −0.77 | −14.83 | −1.14 | −18.17 |
| b* | −13.36 | 17.15 | 17.45 | 11.73 | −2.04 | −13.89 |

| Example | 13 | 14 | 15 | 16 | 17 | 18 |
|---|---|---|---|---|---|---|
| $SiO_2$ | 58.03 | 58.39 | 58.48 | 58.45 | 58.58 | 58.71 |
| $Al_2O_3$ | 16.57 | 16.49 | 16.53 | 16.49 | 16.42 | 16.54 |
| $B_2O_3$ | 6.03 | 6.01 | 6.09 | 6.04 | 5.97 | 5.99 |
| $Li_2O$ | 11.93 | 10.02 | 10.08 | 10.04 | 10.5 | 10.48 |
| $Na_2O$ | 6.23 | 4.28 | 4.26 | 4.25 | 4.71 | 4.76 |
| $K_2O$ | 0.48 | 0.48 | 0.49 | 0.48 | 0.48 | 0.49 |
| MgO | 0.02 | 2.95 | 2.94 | 2.94 | 0.96 | 0.97 |
| CaO | 0.01 | 0.02 | 0.01 | 0.02 | 0.98 | 0.98 |
| ZnO | — | 1.01 | 1.01 | 1.01 | 0.99 | 1.02 |
| $TiO_2$ | 0.01 | 0.01 | 0.01 | 0.01 | 0.01 | 0.01 |
| NiO | 0.093 | 0.021 | — | 0.082 | 0.019 | — |
| $Co_3O_4$ | 0.072 | 0.002 | 0.002 | 0.048 | 0.002 | 0.002 |
| CuO | 0.516 | 0.278 | 0.091 | 0.137 | 0.339 | 0.054 |
| $Cr_2O_3$ | 0.012 | 0.036 | 0.001 | 0.006 | 0.039 | 0.001 |
| $R_2O$ | 18.64 | 14.78 | 14.83 | 14.77 | 15.69 | 15.73 |
| RO | 0.03 | 3.98 | 3.96 | 3.97 | 2.93 | 2.97 |
| $R_2O$ + RO − $Al_2O_3$ | 2.1 | 2.27 | 2.26 | 2.25 | 2.2 | 2.16 |
| MgO + ZnO | 0.02 | 3.96 | 3.95 | 3.95 | 1.95 | 1.99 |
| $Al_2O_3$ + MgO + ZnO | 16.59 | 20.45 | 20.48 | 20.44 | 18.37 | 18.53 |
| Transmittance Color Coordinate | | | | | | |
| L* | 38.93 | 85.89 | 95.05 | 62.68 | 85.25 | 95.29 |
| a* | 1.10 | −9.54 | −0.84 | −2.13 | −10.39 | −0.68 |
| b* | −44.38 | 5.68 | −0.62 | −20.72 | 6.20 | −0.90 |

| Example | 19 |
|---|---|
| $SiO_2$ | 58.51 |
| $Al_2O_3$ | 16.49 |
| $B_2O_3$ | 6.06 |
| $Li_2O$ | 10.47 |
| $Na_2O$ | 4.76 |
| $K_2O$ | 0.49 |
| MgO | 0.97 |
| CaO | 0.99 |
| ZnO | 1.01 |
| $TiO_2$ | 0.01 |
| NiO | 0.085 |
| $Co_3O_4$ | 0.048 |
| CuO | 0.111 |
| $Cr_2O_3$ | 0.005 |
| $R_2O$ | 15.72 |
| RO | 2.97 |
| $R_2O$ + RO − $Al_2O_3$ | 2.2 |
| MgO + ZnO | 1.98 |
| $Al_2O_3$ + MgO + ZnO | 18.47 |
| Transmittance Color Coordinate | |
| L* | 61.08 |
| a* | −2.34 |
| b* | −22.51 |

As indicated by the example glass compositions and colored glass articles in Table 1, the glass compositions described herein improve $Cr_2O_3$ solubility to form colored glass articles having the desired color. For example, example glass composition 1 including 0.098 mol % $Cr_2O_3$ formed a colored glass article having a transmittance color coordinate in the CIELAB color space of L*=83.78, a*=−12.60, and b*=62.26.

As further indicated by the example glass compositions and colored glass articles in Table 1, adding other colorants in addition to $Cr_2O_3$ as described herein allows different color gamuts to be achieved. For example, example glass composition 2 including 0.068 mol % $Cr_2O_3$, 0.001 mol % $Co_3O_4$, and 0.83 mol % CuO formed a colored glass article have a transmittance color coordinate in the CIELAB color space of L*=77.06, a*=−26.24, and b*=8.74. Example glass composition 3, including 0.038 mol % $Cr_2O_3$, 0.023 mol % NiO, 0.002 mol % $Co_3O_4$, and 0.233 mol % CuO formed a colored glass article have a transmittance color coordinate in the CIELAB color space of L*=85.88, a*=−9.40, and b*=6.26.

It will be apparent to those skilled in the art that various modifications and variations may be made to the embodiments described herein without departing from the spirit and scope of the claimed subject matter. Thus, it is intended that the specification cover the modifications and
variations of the various embodiments described herein provided such modification and
variations come within the scope of the appended claims and their equivalents.

What is claimed is:

1. A colored glass article comprising:
   greater than or equal to 50 mol % and less than or equal to 70 mol % $SiO_2$;
   greater than or equal to 10 mol % and less than or equal to 17.5 mol % $Al_2O_3$;
   greater than or equal to 3 mol % and less than or equal to 10 mol % $B_2O_3$;
   greater than or equal to 8.8 mol % and less than or equal to 14 mol % $Li_2O$;
   greater than or equal to 1.5 mol % and less than or equal to 8 mol % $Na_2O$;
   greater than or equal to 0.001 mol % and less than or equal to 2 mol % $Cr_2O_3$;
   less than or equal to 0.01 mol % $TiO_2$, wherein:
   $R_2O+RO-Al_2O_3$ is greater than or equal to 0.5 mol % and less than or equal to 6 mol %, wherein $R_2O$ is the sum of $Li_2O$, $Na_2O$, and $K_2O$ and RO is the sum of MgO, ZnO, and CaO; and
   $Al_2O_3+MgO+ZnO$ is greater than or equal to 12 mol % and less than or equal to 22 mol %.

2. The colored glass article of claim 1, wherein the colored glass article comprises greater than or equal to 0.005 mol % and less than or equal to 1.5 mol % $Cr_2O_3$.

3. The colored glass article of claim 1, wherein the colored glass article comprises greater than or equal to 12 mol % and less than or equal to 17.25 mol % $Al_2O_3$.

4. The colored glass article of claim 1, wherein the colored glass article comprises greater than or equal to 3.5 mol % and less than or equal to 9 mol % $B_2O_3$.

5. The colored glass article of claim 1, wherein the colored glass article comprises NiO, CuO, $Co_3O_4$, or combinations thereof.

6. The colored glass article of claim 1, wherein MgO+ZnO is greater than or equal to 0 mol % and less than or equal to 4.5 mol %.

7. The colored glass article of claim 1, wherein $R_2O+RO-Al_2O_3$ is greater than or equal to 1 mol % and less than or equal to 5.5 mol %.

8. The colored glass article of claim 1, wherein $Al_2O_3+MgO+ZnO$ is greater than or equal to is greater than or equal to 13 mol % and less than or equal to 21.5 mol %.

9. The colored glass article of claim 1, wherein the colored glass article has a transmittance color coordinate in the CIELAB color space, as measured at an article thickness of 1.5 mm under F2 illumination and a 10° standard observer angle, of:
   $L^*$ greater than or equal to 0 and less than or equal to 100;
   $a^*$ greater than or equal to −18 and less than or equal to 0; and
   $b^*$ greater than or equal to 0 and less than or equal to 82.

10. The colored glass article of claim 1, wherein the colored glass article has a $K_{1C}$ fracture toughness as measured by a chevron notch short bar method of greater than or equal to 0.7 $MPa*m^{0.5}$.

11. The colored glass article of claim 1, wherein the colored glass article is a chemically strengthened glass article.

12. The colored glass article of claim 11, wherein the colored glass article has a surface compressive stress greater than or equal to 300 MPa.

13. The colored glass article of claim 11, wherein the colored glass article has a maximum central tension greater than or equal to 40 MPa.

14. The colored glass article of claim 11, wherein the colored glass article has a depth of compression greater than or equal to 0.15t, where t is the thickness of the colored glass article.

15. A glass composition comprising:
   greater than or equal to 50 mol % and less than or equal to 70 mol % $SiO_2$;
   greater than or equal to 10 mol % and less than or equal to 17.5 mol % $Al_2O_3$;
   greater than or equal to 3 mol % and less than or equal to 10 mol % $B_2O_3$;
   greater than or equal to 8.8 mol % and less than or equal to 14 mol % $Li_2O$;
   greater than or equal to 1.5 mol % and less than or equal to 8 mol % $Na_2O$; and
   greater than or equal to 0.001 mol % and less than or equal to 0.2 mol % $Cr_2O_3$, wherein:
   $R_2O+RO-Al_2O_3$ is greater than or equal to 0.5 mol % and less than or equal to 6 mol %, wherein $R_2O$ is the sum of $Li_2O$, $Na_2O$, and $K_2O$ and RO is the sum of MgO, ZnO, and CaO;
   $Al_2O_3+MgO+ZnO$ is greater than or equal to 12 mol % and less than or equal to 22 mol %, and
   the glass composition has a transmittance color coordinate in the CIELAB color space, as measured at an article thickness of 1.5 mm under F2 illumination and a 10° standard observer angle, of:
   $L^*$ greater than or equal to 0 and less than or equal to 100;
   $a^*$ greater than or equal to −18 and less than or equal to −0.65; and
   $b^*$ greater than or equal to 5.68 and less than or equal to 82.

16. The glass composition of claim 15, wherein the glass composition comprises greater than or equal to 0.005 mol % and less than or equal to 0.2 mol % $Cr_2O_3$.

17. The glass composition of claim 15, wherein the glass composition comprises greater than or equal to 12 mol % and less than or equal to 17 mol % $Al_2O_3$.

18. The glass composition of claim 15, wherein MgO+ZnO is greater than or equal to 0 mol % and less than or equal to 4.5 mol %.

19. The glass composition of claim 15, wherein $R_2O+RO-Al_2O_3$ is greater than or equal to 1 mol % and less than or equal to 5.5 mol %.

20. The glass composition of claim 15, wherein $Al_2O_3+MgO+ZnO$ is greater than or equal to is greater than or equal to 14 mol % and less than or equal to 20 mol %.

* * * * *